United States Patent
Miyashita

(10) Patent No.: US 11,867,889 B2
(45) Date of Patent: Jan. 9, 2024

(54) LENS SYSTEM AND IMAGING APPARATUS

(71) Applicant: NITTOH INC., Suwa (JP)

(72) Inventor: Yuya Miyashita, Suwa (JP)

(73) Assignee: NITTOH INC., Suwa (JP)

(*) Notice: Subject to any disclaimer, the term of this patent is extended or adjusted under 35 U.S.C. 154(b) by 487 days.

(21) Appl. No.: 17/252,803

(22) PCT Filed: Jun. 18, 2019

(86) PCT No.: PCT/JP2019/024031
§ 371 (c)(1),
(2) Date: Dec. 16, 2020

(87) PCT Pub. No.: WO2019/244867
PCT Pub. Date: Dec. 26, 2019

(65) Prior Publication Data
US 2021/0263291 A1    Aug. 26, 2021

(30) Foreign Application Priority Data

Jun. 19, 2018  (JP) ................... 2018-115756

(51) Int. Cl.
*G02B 15/14*   (2006.01)
*G02B 13/02*   (2006.01)
*G02B 27/00*   (2006.01)

(52) U.S. Cl.
CPC ..... *G02B 15/144515* (2019.08); *G02B 13/02* (2013.01); *G02B 27/0025* (2013.01)

(58) Field of Classification Search
CPC .......... G02B 9/64; G02B 13/02; G02B 13/26; G02B 15/144515; G02B 27/0025
See application file for complete search history.

(56) References Cited

U.S. PATENT DOCUMENTS

2014/0002910 A1  1/2014  Roth et al.
2016/0266370 A1  9/2016  Uchida et al.

FOREIGN PATENT DOCUMENTS

JP   2004-061679 A   2/2004
JP   2012-053260 A   3/2012
WO   2015/072245 A1  5/2015

OTHER PUBLICATIONS

PCT, Japan Patent Office (ISA/JP), International Search Report (with English translation), International Application No. PCT/JP2019/024031, 2 pages (dated Aug. 6, 2019)
English translation of PCT Written Opinion, International Application No. PCT/JP2019/024031; dated Aug. 6, 2019, 4 pages.

*Primary Examiner* — Jack Dinh
(74) *Attorney, Agent, or Firm* — THOMPSON HINE LLP

(57) ABSTRACT

A lens system for imaging includes, in order from the object side, a first lens group with negative refractive power, a second lens group with positive refractive power, a third lens group with positive refractive power, a stop, and a fourth lens group with positive refractive power. The third lens group includes, closest to the image plane side, a cemented lens on the object side of the stop and whose image plane-side surface includes a concave surface on the object side. The fourth lens group includes, closest to the object side, a cemented lens on the image plane side of the stop and whose object-side surface includes a concave surface on the image plane side. A radius of curvature g3er of the object side concave surface and the radius of curvature g4fr of the image plane side concave surface satisfy the following condition: $2.5 \leq |g4fr/g3er| \leq 4.0$.

15 Claims, 10 Drawing Sheets

Fig. 2

| SURFACE (Si) | RADIUS OF CURVATURE (ri) (mm) | DISTANCE (di) (mm) | REFRACTIVE INDEX (ni) | ABBE NUMBER ($\nu$i) | EFFECTIVE DIAMETER(Di) (mm) | LENS | | FOCAL LENGTH (mm) |
|---|---|---|---|---|---|---|---|---|
| 1 | 65.794 | 13.50 | 1.80810 | 22.76 | 76.50 | L11 | | G1 −131.56 |
| 2 | 699.607 | 6.07 | | | 74.58 | | | |
| 3 | 321.094 | 1.40 | 1.62004 | 36.26 | 62.76 | L12 | | |
| 4 | 50.821 | 11.80 | | | 54.76 | | | |
| 5 | −109.020 | 1.40 | 1.85896 | 22.73 | 54.46 | L13 | | |
| 6 | 169.047 | (VARIABLE) | | | 53.34 | | | |
| 7 | −670.649 | 1.40 | 1.80518 | 25.43 | 53.18 | L21 | | G2 135.28 |
| 8 | 110.441 | 9.34 | 1.78590 | 44.20 | 53.28 | L22 | B1 | |
| 9 | −90.454 | (VARIABLE) | | | 53.32 | | | |
| 10 | 52.409 | 7.28 | 1.85150 | 40.78 | 54.44 | L31 | | G3 113.40 |
| 11 | 154.796 | 0.20 | | | 53.32 | | | |
| 12 | 50.381 | 4.34 | 1.80810 | 22.76 | 50.40 | L32 | | |
| 13 | 69.345 | 0.20 | | | 48.68 | | | |
| 14 | 38.350 | 9.16 | 1.43875 | 94.66 | 45.56 | L33 | | |
| 15 | 373.841 | 1.40 | 1.72047 | 34.71 | 43.06 | L34 | B2 | |
| 16 | 27.878 | (VARIABLE) | | | 36.28 | | | |
| 17 | INFINITY | 4.50 | | | 32.80 | St | | |
| 18 | −85.863 | 1.40 | 1.68893 | 31.08 | 31.60 | L41 | | G4 66.61 |
| 19 | 25.903 | 10.70 | 1.49700 | 81.55 | 30.94 | L42 | B3 | |
| 20 | −57.207 | 3.50 | | | 31.28 | | | |
| 21 | −37.867 | 5.00 | 1.49700 | 81.55 | 31.00 | L43 | | |
| 22 | −27.456 | 0.31 | | | 31.72 | | | |
| 23 | −26.294 | 1.40 | 1.72047 | 34.71 | 31.72 | L44 | | |
| 24 | 52.134 | 11.60 | 1.88300 | 40.77 | 37.30 | L45 | B4 | |
| 25 | −42.760 | 10.85 | | | 39.52 | | | |
| 26 | −95.481 | 2.00 | 1.73077 | 40.51 | 44.24 | L46 | | |
| *27 | −250.000 | 0.80 | | | 45.82 | | | |
| 28 | 110.327 | 7.48 | 1.80810 | 22.76 | 48.76 | L47 | | |
| 29 | −110.327 | 44.24 | | | 49.04 | | | |
| 30 | INFINITY | 3.00 | 1.51633 | 64.14 | 43.62 | FILTER | | |
| 31 | INFINITY | 3.00 | | | 43.40 | IMAGE PLANE | | |

Fig. 3

| FOCUS | OBJECT DISTANCE (mm) | FOCAL LENGTH (mm) | F No. | ANGLE OF VIEW (°) | DISTANCE (mm) | | |
|---|---|---|---|---|---|---|---|
| | | | | | d6 | d9 | d16 |
| INFINITY | INFINITY | 95.00 | 1.68 | 25.47 | 6.68 | 26.53 | 9.52 |
| STANDARD | 2280 | 93.90 | 1.68 | 25.35 | 12.31 | 19.09 | 11.33 |
| CLOSEST | 630 | 91.47 | 1.68 | 25.12 | 23.70 | 4.00 | 15.03 |

Fig. 4

| SURFACE (Si) | K | A | B | C | D | E | F |
|---|---|---|---|---|---|---|---|
| 27 | 85.8623 | 1.57252E−06 | 7.94455E−10 | −1.37080E−12 | 1.14535E−14 | −2.32799E−17 | 1.94269E−20 |

Fig. 5
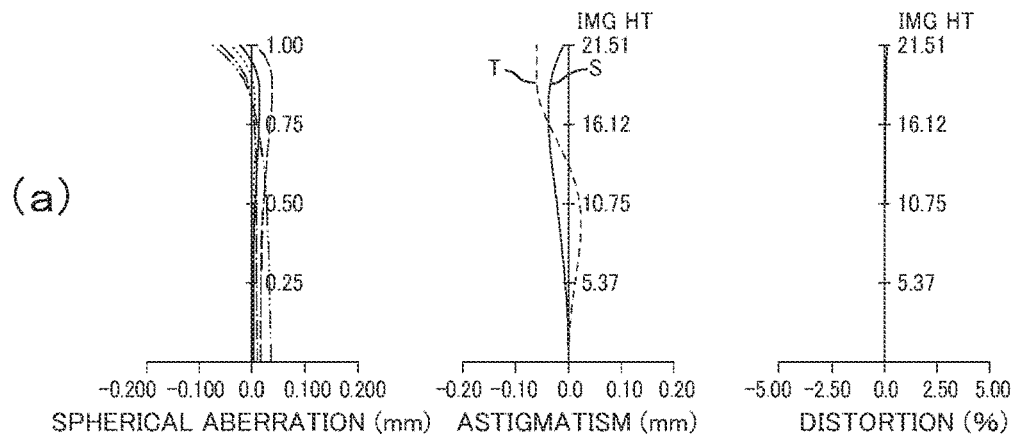
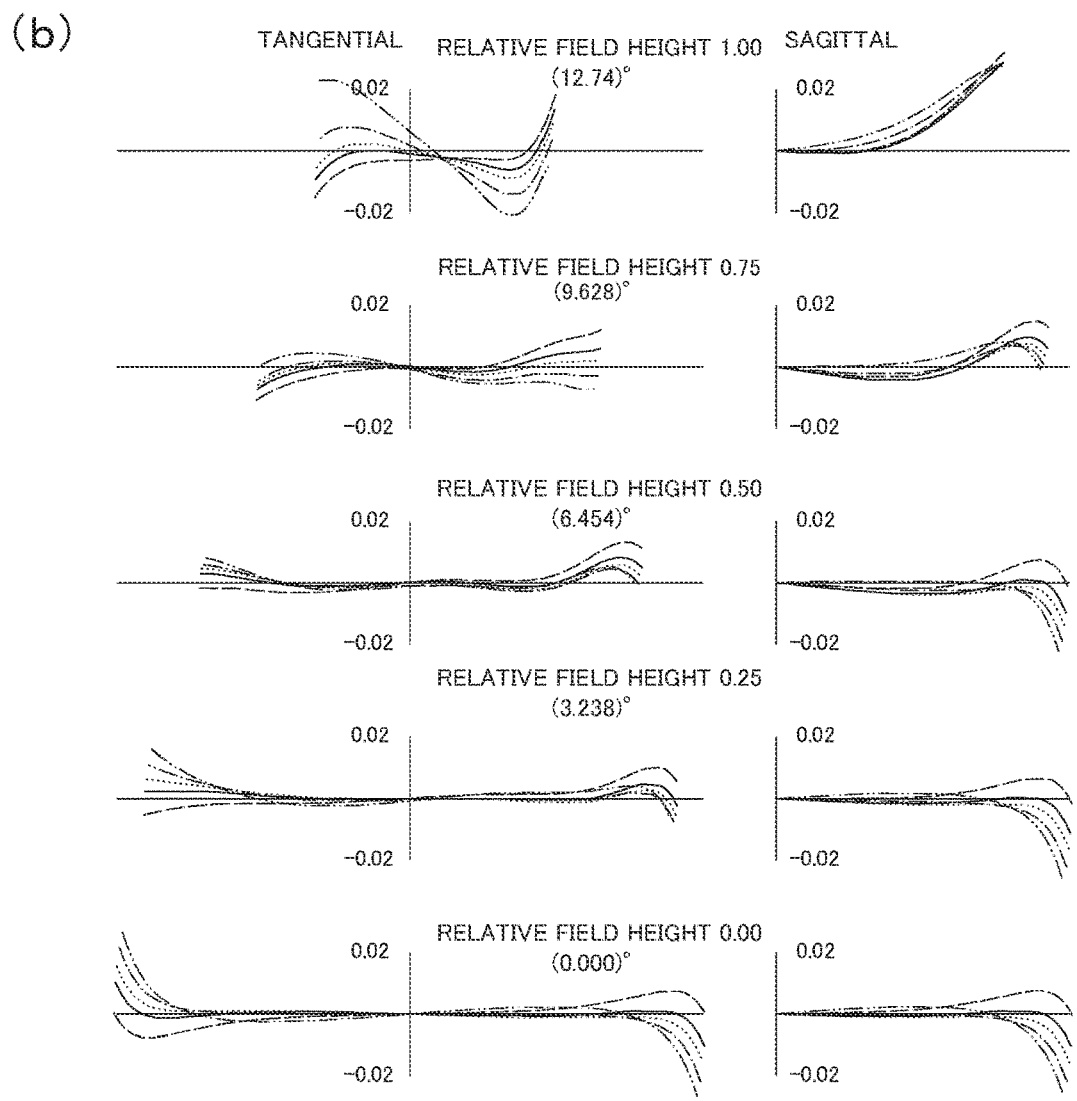

Fig. 6
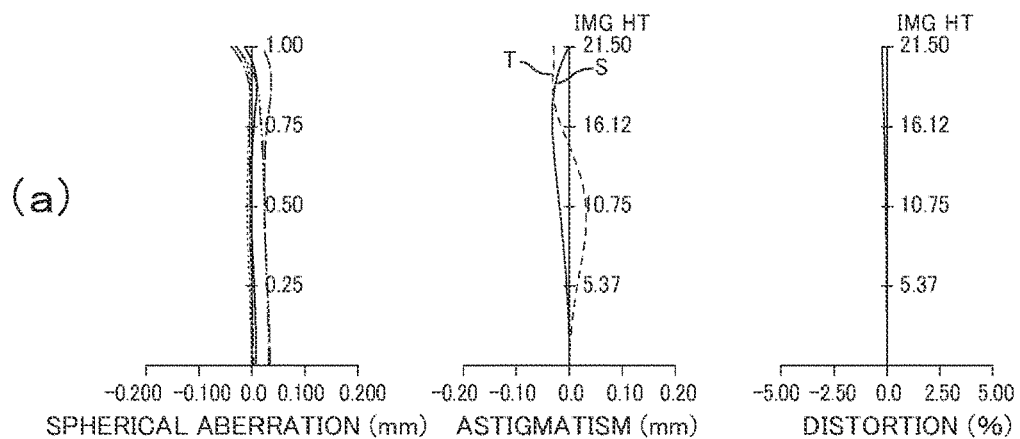
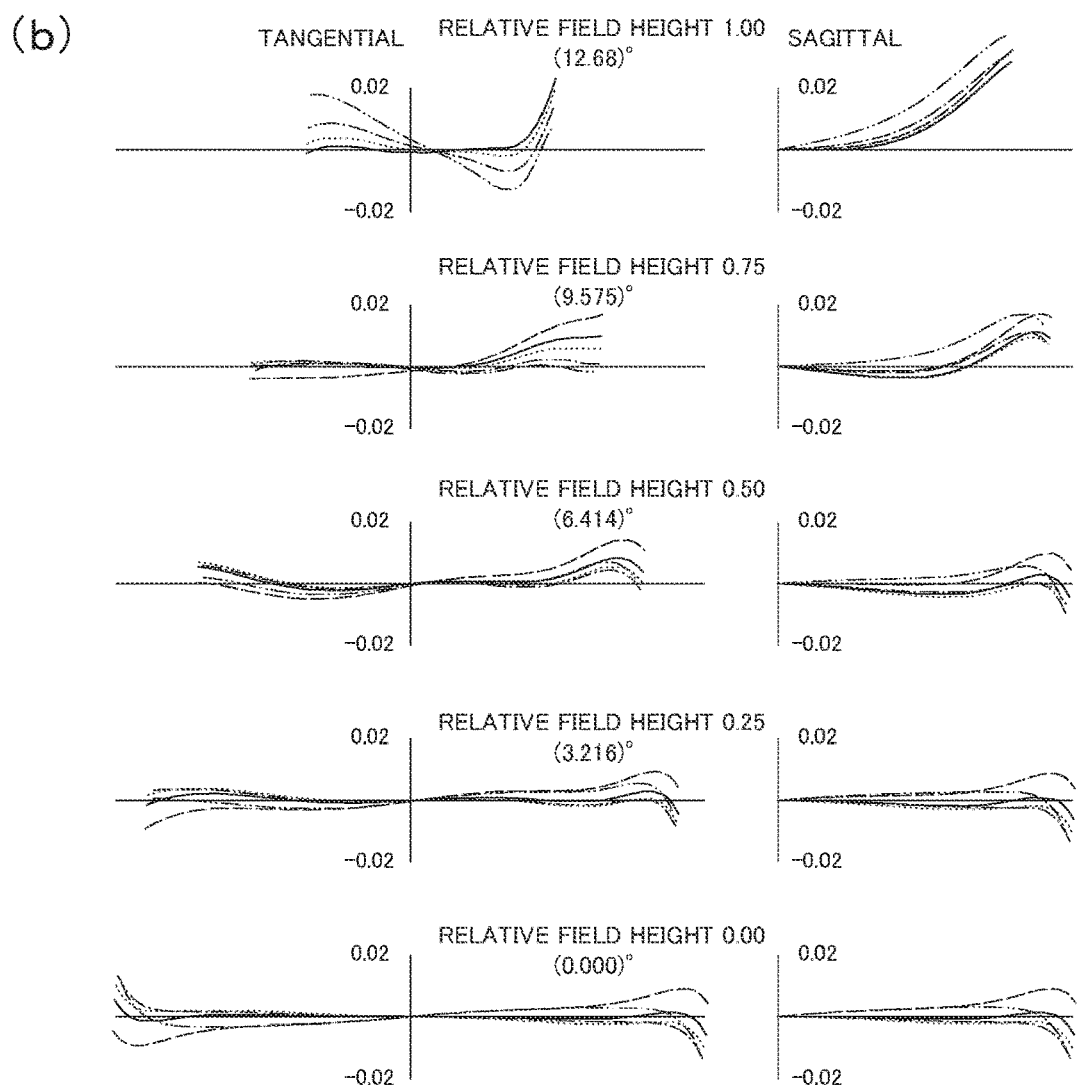

Fig. 7
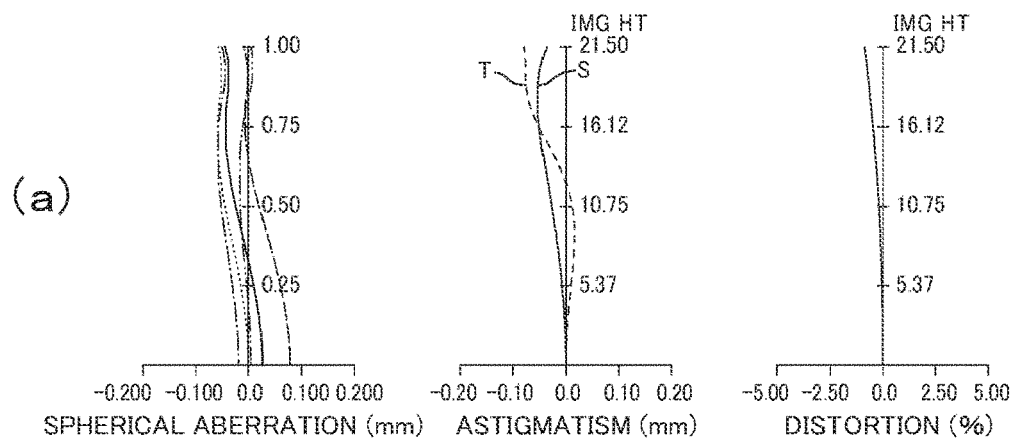
(a)
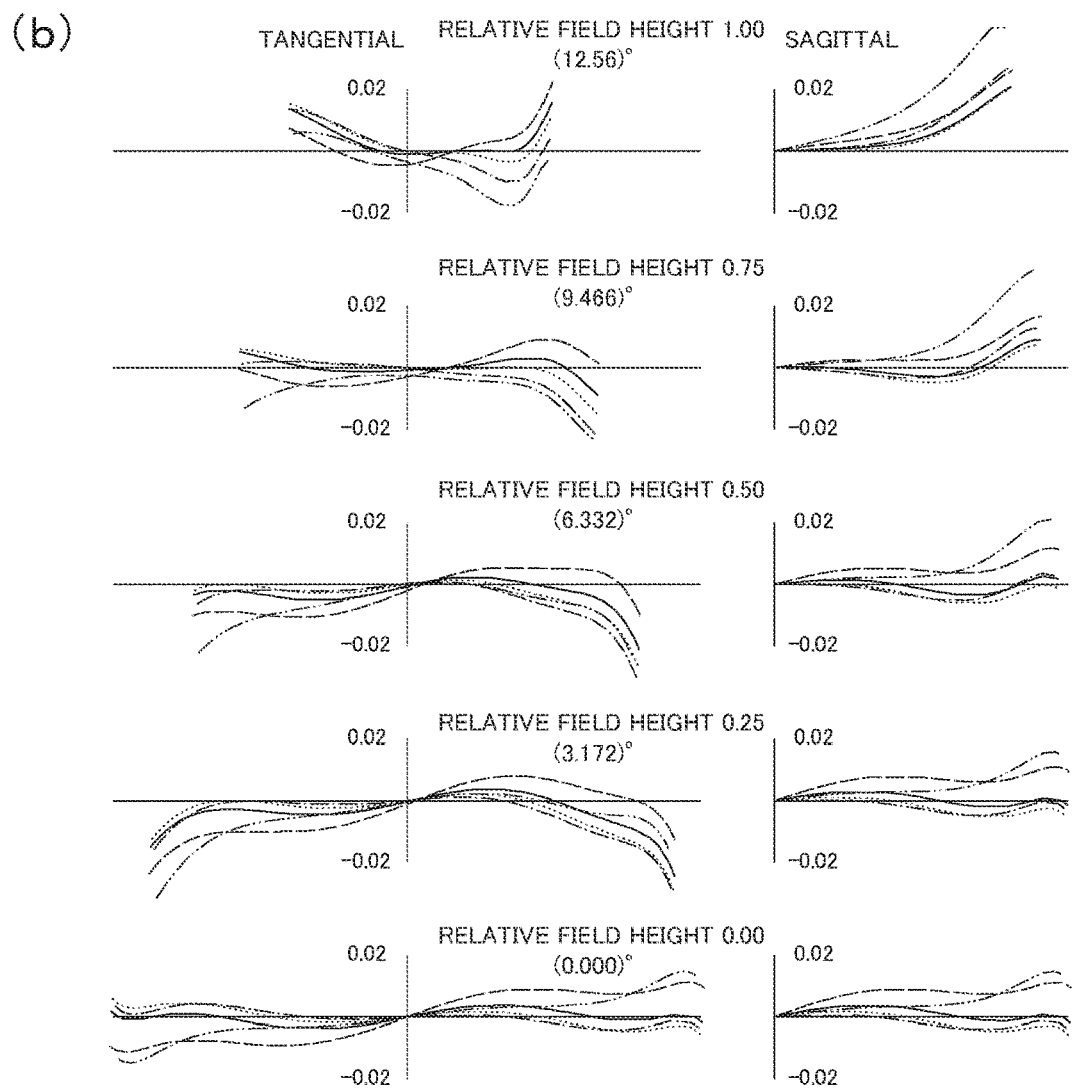
(b)

Fig. 9

| SURFACE (Si) | RADIUS OF CURVATURE (ri) (mm) | DISTANCE (di) (mm) | REFRACTIVE INDEX (ni) | ABBE NUMBER ($\nu$i) | EFFECTIVE DIAMETER(Di) (mm) | LENS | | FOCAL LENGTH (mm) |
|---|---|---|---|---|---|---|---|---|
| 1 | 65.887 | 13.50 | 1.80810 | 22.76 | 77.40 | L11 | | G1 -132.25 |
| 2 | 562.770 | 7.06 | | | 75.50 | | | |
| 3 | 319.188 | 1.40 | 1.62004 | 36.26 | 62.60 | L12 | | |
| 4 | 50.668 | 11.44 | | | 54.68 | | | |
| 5 | -116.602 | 1.40 | 1.85896 | 22.73 | 54.52 | L13 | | |
| 6 | 159.619 | (VARIABLE) | | | 53.34 | | | |
| 7 | -513.235 | 1.40 | 1.80518 | 25.43 | 53.16 | L21 | B1 | G2 139.90 |
| 8 | 113.096 | 9.32 | 1.78590 | 44.20 | 53.30 | L22 | | |
| 9 | -89.402 | (VARIABLE) | | | 53.36 | | | |
| 10 | 52.303 | 6.99 | 1.85150 | 40.78 | 54.72 | L31 | | G3 110.39 |
| 11 | 134.335 | 0.20 | | | 53.62 | | | |
| 12 | 55.336 | 4.64 | 1.80810 | 22.76 | 51.42 | L32 | | |
| 13 | 85.963 | 0.20 | | | 49.86 | | | |
| 14 | 36.645 | 9.83 | 1.43875 | 94.66 | 45.66 | L33 | B2 | |
| 15 | 405.491 | 1.40 | 1.72047 | 34.71 | 42.96 | L34 | | |
| 16 | 27.305 | (VARIABLE) | | | 36.00 | | | |
| 17 | INFINITY | 4.72 | | | 32.58 | St | | |
| 18 | -73.979 | 1.40 | 1.68893 | 31.08 | 31.36 | L41 | B3 | G4 65.94 |
| 19 | 24.270 | 13.50 | 1.49700 | 81.55 | 30.98 | L42 | | |
| 20 | -42.856 | 2.97 | | | 31.96 | | | |
| 21 | -31.438 | 1.40 | 1.72047 | 34.71 | 31.80 | L43 | B4 | |
| 22 | 41.036 | 12.30 | 1.88300 | 40.77 | 36.20 | L44 | | |
| 23 | -43.988 | 14.86 | | | 38.50 | | | |
| 24 | -76.264 | 1.40 | 1.73077 | 40.51 | 43.98 | L45 | | |
| *25 | -209.002 | 0.51 | | | 45.68 | | | |
| 26 | 111.799 | 8.06 | 1.80810 | 22.76 | 48.82 | L46 | | |
| 27 | -91.701 | 40.77 | | | 49.18 | | | |
| 28 | INFINITY | 3.00 | 1.51633 | 64.14 | 43.66 | FILTER | | |
| 29 | INFINITY | 3.00 | | | 43.42 | IMAGE PLANE | | |

Fig. 10

| FOCUS | OBJECT DISTANCE (mm) | FOCAL LENGTH (mm) | F No. | ANGLE OF VIEW (°) | DISTANCE (mm) | | |
|---|---|---|---|---|---|---|---|
| | | | | | d6 | d9 | d16 |
| INFINITY | INFINITY | 95.00 | 1.68 | 25.45 | 6.97 | 26.79 | 9.56 |
| STANDARD | 2280 | 94.10 | 1.68 | 25.27 | 12.68 | 19.23 | 11.41 |
| CLOSEST | 630 | 91.71 | 1.68 | 25.02 | 24.37 | 4.00 | 14.95 |

Fig. 11

| SURFACE (Si) | K | A | B | C | D | E | F |
|---|---|---|---|---|---|---|---|
| 25 | 50.3048 | 1.85012E-06 | -5.34942E-11 | 4.71909E-12 | -9.09608E-15 | 1.06111E-17 | -3.14915E-21 |

Fig. 14
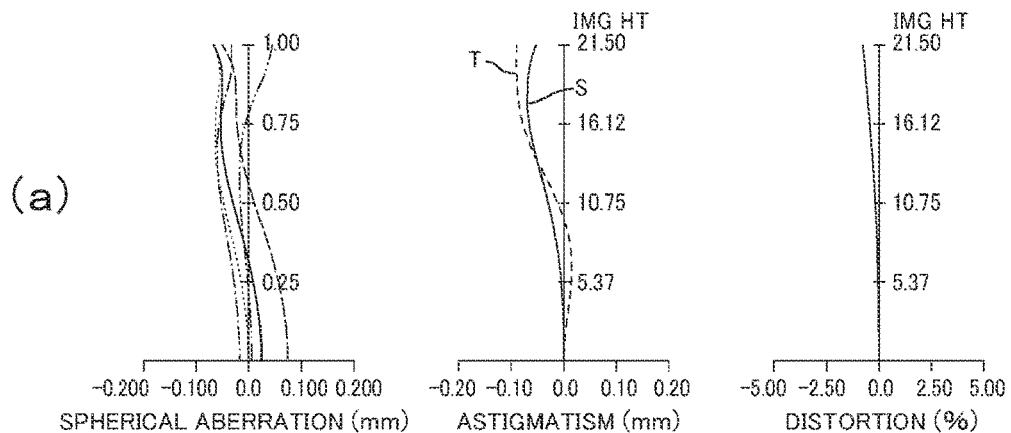
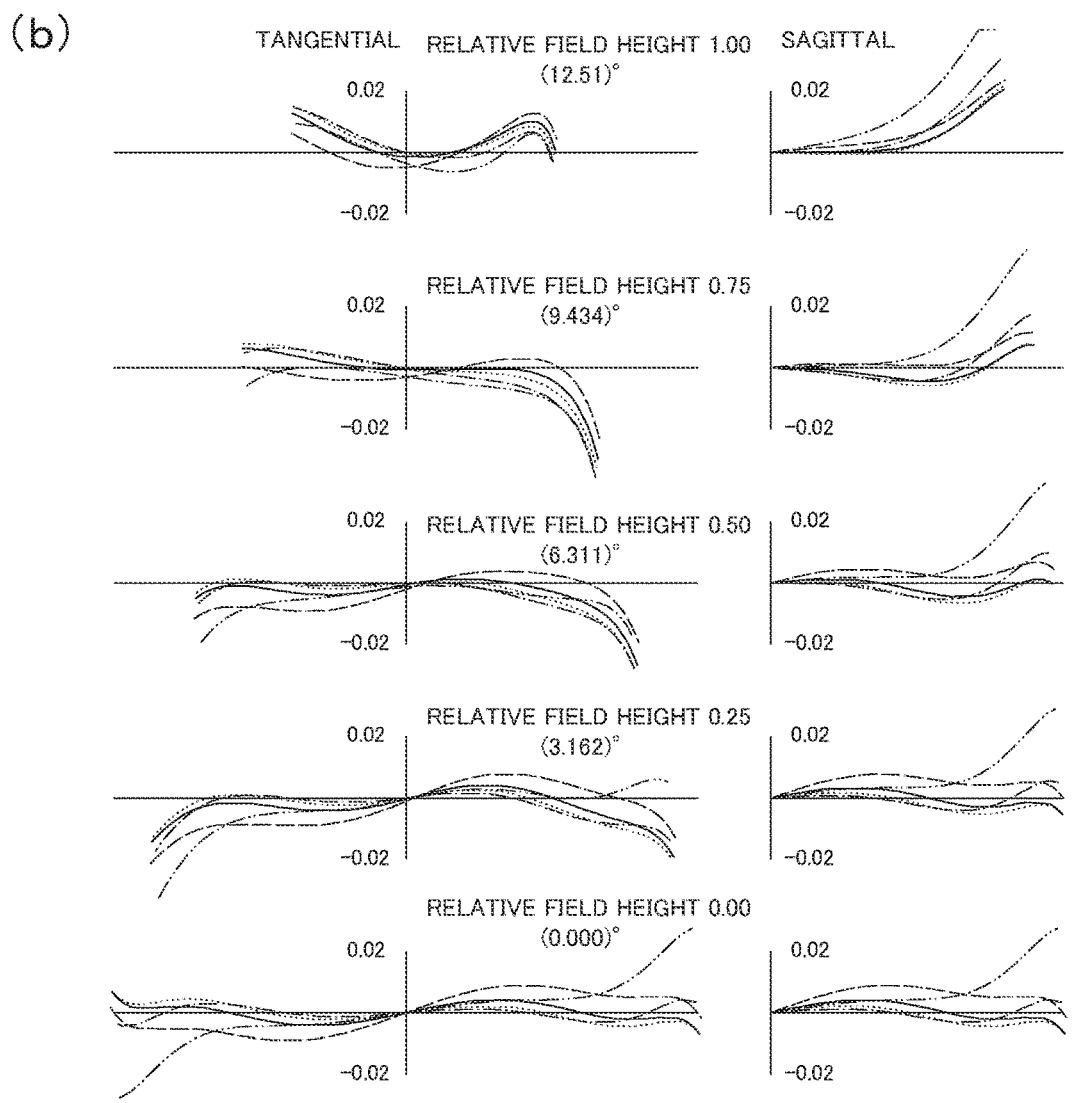

LENS SYSTEM AND IMAGING APPARATUS

CROSS-REFERENCE TO RELATED APPLICATIONS

This application is a national stage filing of International Application No. PCT/JP2019/024031 (International Publication No. WO 2019/244867), filed on Jun. 18, 2019, which claims priority to Japanese Patent Application No. 2018-115756, filed on Jun. 19, 2018. The entire contents of each of these applications is incorporated by reference herein.

TECHNICAL FIELD

The present invention relates to a lens system and an imaging apparatus equipped with the same.

BACKGROUND ART

Japanese Laid-open Patent Publication No. 2012-53260 discloses, as a bright macro lens with little fluctuation in aberration from a focusing state for objects at infinity to a focusing state for objects at close range where the image pickup magnification is life size, a macro lens composed, in order from the object side, of a positive first group, a negative second group, a positive third group, and a negative fourth group. When moving the focus from a focusing state for objects at infinity to a focusing state for objects at close range where the image pickup magnification is life size, the first group and the fourth group do not move, the second group moves toward the image side, and the third group and the stop move together toward the object.

SUMMARY OF INVENTION

There is demand for a lens system that is easier to handle and is capable of acquiring images in which aberrations have been favorably corrected, and for an imaging apparatus equipped with such a lens system.

One aspect of the present invention is a lens system for imaging that is composed, in order from an object side (subject side), of a first lens group that has negative refractive power, a second lens group that has positive refractive power, a third lens group that has positive refractive power, a stop, and a fourth lens group that has positive refractive power, wherein the third lens group includes, at a position closest to an image plane side, a cemented lens disposed on the object side of the stop and whose image plane side-surface includes a surface that is concave on the object side, the fourth lens group includes, at a position closest to the object side, a cemented lens which is disposed closest to the image plane side of the stop, and whose object side surface includes a surface that is concave on the image plane side, and a radius of curvature g3er of the surface that is concave on the object side and the radius of curvature g4fr of the surface that is concave on the image surface side satisfy a following condition.

$$2.5 \leq |g4fr/g3er| \leq 4.0$$

This lens system has a negative-positive-positive-positive retrofocus-type arrangement of refractive powers, and by disposing cemented lenses whose concave surfaces face one another on both sides of the stop disposed on the object side of the fourth lens group, it is possible to construct a symmetrical arrangement centered on the stop, which is capable of favorably correcting aberrations. In addition, by adding asymmetry in that the radius of curvature of the concave surface on the image plane side of the stop is more gradual than the radius of curvature of the concave surface on the object side, it is possible, using the retrofocus arrangement, to reduce the sensitivity of the fourth lens group that is on the image plane side of the stop and sensitive to tolerances. This means that it is possible to provide a lens system where aberrations are favorably corrected, the performance is stable, and handling is easy.

The cemented lens disposed on the object side of the stop and the cemented lens disposed on the image plane side of the stop may include negative refractive powers, and a focal length B2f of the cemented lens disposed on the object side of the stop and a focal length B3f of the cemented lens disposed on the image plane side of the stop may satisfy a following condition.

$$1.7 \leq B3f/B2f \leq 3.0$$

The fourth lens group may include a meniscus lens that has positive refractive power, is concave on the object side, and is disposed on the image plane side of the cemented lens disposed on the image plane side of the stop. A radius of curvature B3er of a surface, which is convex on the image plane side, on the image plane side of the cemented lens disposed on the image plane side of the stop and a radius of curvature Lbfr of a surface, which is concave on the object side, on the object side of the meniscus lens with positive refractive power may satisfy a following condition.

$$1.35 \leq |B3er/Lbfr| \leq 1.55$$

The fourth lens group may include another cemented lens disposed on the image plane side of the meniscus lens with positive refractive power, and a radius of curvature Lber of a surface, which is convex on the image plane side, on the image plane side of the meniscus lens with positive refractive power and a radius of curvature B4fr of a surface, which is concave on the object side, on the object side of the cemented lens disposed on the image plane side of the meniscus lens with positive refractive power may satisfy a following condition.

$$1.03 \leq |Lber/B4fr| \leq 1.07$$

In addition, a distance Ld41 on the optical axis between a surface, which is convex on the image plane side, on the image plane side of the cemented lens disposed on the image plane side of the stop and a surface, which is concave on the object side, on the object side of the meniscus lens with positive refractive power and a distance Ld43 on the optical axis between a surface, which is convex on the image plane side, on the image plane side of the meniscus lens with positive refractive power and a surface, which is concave on the object side, on the object side of the cemented lens disposed on the image plane side of the meniscus lens with positive refractive power may satisfy a following condition.

$$7 \leq Ld41/Ld43 \leq 23$$

A distance Ld41 on the optical axis between a surface, which is convex on the image plane side, on the image plane side of the cemented lens disposed on the image plane side of the stop and a surface, which is concave on the object side, on the object side of the meniscus lens with positive refractive power and a thickness Ld42 on the optical axis of the meniscus lens with positive refractive power may satisfy a following condition.

$$0.6 \leq Ld41/Ld42 \leq 1.0$$

The second lens group may include a first cemented lens and an effective diameter B1D of the first cemented lens, an effective diameter B2D of a second cemented lens on the object side of the stop in the third lens group, an effective diameter B3D of a third cemented lens on the image plane side of the stop in the fourth lens group, and an effective diameter B4D of a fourth cemented lens on the image plane side of a lens with positive refractive power in the fourth lens group may satisfy following conditions.

$$B1D>B2D$$

$$B3D<B4D$$

In addition, a difference between an Abbe number B1$p$ of the lens with positive refractive power and an Abbe number B1$m$ of the lens with negative refractive power in the first cemented lens, a difference between an Abbe number B2$p$ of the lens with positive refractive power and an Abbe number B2$m$ of the lens with negative refractive power in the second cemented lens, a difference between an Abbe number B3$p$ of the lens with positive refractive power and an Abbe number B3$m$ of the lens with negative refractive power in the third cemented lens, and a difference between an Abbe number B4$p$ of the lens with positive refractive power and an Abbe number B4$m$ of the lens with negative refractive power in the fourth cemented lens may satisfy following conditions.

$$|B1p-B1m|<|B2p-B2m|$$

$$|B3p-B3m|>|B4p-B4m|$$

In this lens system, during focusing from infinity to a closest distance (nearest distance), a distance between the first lens group and the second lens group along the optical axis may increase, a distance between the second lens group and the third lens group along the optical axis may decrease, and the fourth lens group and the stop, which is disposed on the object side of the fourth lens group, may be fixed with respect to the image plane. In addition, when focusing from infinity to the closest distance, the first lens group may be fixed relative to the image plane, the second lens group may move toward the image plane side, and the third lens group may move toward the object side.

Another aspect of the present invention is an imaging apparatus (image pickup apparatus) including: the lens system described above; and an imaging element (image pickup element) disposed on the image plane side of the lens system.

BRIEF DESCRIPTION OF DRAWINGS

FIG. 2 is a diagram showing lens data.

FIG. 3 is a diagram showing numerical values that fluctuate during focusing.

FIG. 4 is a diagram showing aspherical coefficients.

FIG. 5 is a diagram showing various aberrations when the focal length is at infinity.

FIG. 6 is a diagram showing various aberrations when the focal length is at a standard distance (an intermediate distance).

FIG. 7 is a diagram showing various aberrations when the focal length is at a closest position.

FIG. 9 is a diagram showing lens data of the lens system in FIG. 8.

FIG. 10 is a diagram showing numerical values that fluctuate during focusing.

FIG. 11 is a diagram showing aspherical coefficients.

FIG. 14 is a diagram showing various aberrations when the focal length is at a closest position.

DESCRIPTION OF EMBODIMENTS

Figure 1:
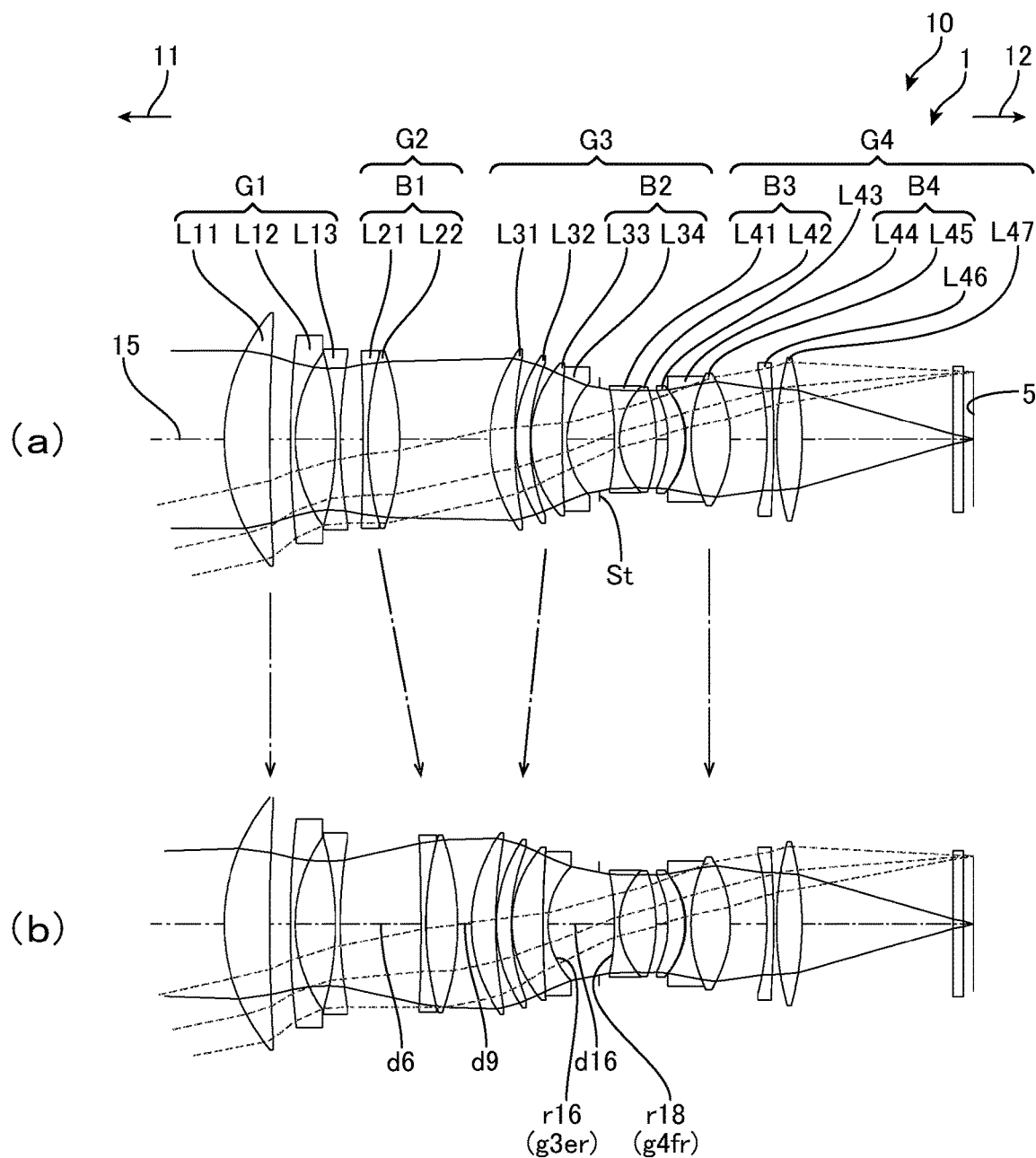
FIG. 1 is a diagram depicting an arrangement of a lens system and an imaging apparatus according to an embodiment.

FIG. 1 depicts one example of an imaging apparatus (image pickup apparatus, camera or camera apparatus) equipped with an optical system for imaging (image pickup). FIG. 1($a$) depicts the arrangement of lenses when focusing at infinity, and FIG. 1($b$) depicts the arrangement of lenses when focusing at the closest position (the nearest position). This camera 1 includes an optical system (imaging optical system, image forming optical system, or lens system) 10 and an imaging element (image pickup element, image pickup device or image plane) 5 disposed on an image plane side (imaging side, image pickup side or image forming side) 12 of the optical system 10. The optical system 10 is a lens system 10 for image pickup and is a lens system composed of 16 elements in 4 groups. In more detail, the lens system 10 includes, in order from the object side (subject side) 11, a first lens group G1 that has negative refractive power and is fixed in position with respect to the image plane 5, a second lens group G2 and a third lens group G3 that have positive refractive power and move along an optical axis 15 during focusing, and a fourth lens group G4 that has positive refractive power, has a position that is fixed with respect to the image plane 5, and has a stop (aperture stop) St that is disposed on the object side 11. Images are formed on the image plane 5 by these four lens groups G1 to G4.

A high-performance lens system 10 with high aberration-correcting performance typically has a large number of lens elements and a large aperture. This makes the lens system heavy and difficult to handle, and therefore makes it difficult to acquire stable images. In particular, lens systems for pickup of high-quality images such as movies are often composed of ten to nearly twenty lens elements, which makes them unwieldy and difficult to handle. In addition, since the F number also fluctuates due to the stop moving during focusing, it takes a lot of skill and experience for a cameraman to acquire images with little fluctuation in brightness while adjusting the focus. On the other hand, the lens system 10 according to the present invention is a lens system where the stop St does not move during focusing and there is little fluctuation in the F number (F No.).

The first lens group G1 of the lens system 10, which has negative refractive power and is disposed closest to the object side 11 (the most object side) has a three-lens configuration including, in order from the object side 11, a meniscus lens L11 with positive refractive power that is convex on the object side 11, a meniscus lens L12 with negative refractive power that is convex on the object side 11, and a biconcave negative lens L13. That is, the first lens group G1 is a lens group with a positive-negative-negative arrangement of refractive powers in order from the object side 11. The second lens group G2, which has positive refractive power, has a two-lens configuration composed, in order from the object side 11, of a biconcave negative lens L21 and a biconvex positive lens L22. The negative lens L21 and the positive lens L22 construct a first cemented lens B1 that has overall positive refractive power and is meniscus type convex on the image plane side 12. That is, the second lens group G2 is a lens group that has a negative-positive arrangement of refractive powers in order from the object side 11, with the two lenses constructing a cemented lens.

The third lens group G3, which has overall positive refractive power has a four-lens configuration including, in order from the object side 11, a meniscus lens L31 with positive refractive power that is convex on the object side 11, a meniscus lens L32 with positive refractive power that is convex on the object side 11, a meniscus lens L33 with positive refractive power that is convex on the object side 11, and a meniscus lens L34 with negative refractive power that is concave on the image plane side 12. The positive meniscus lens L33 and the negative meniscus lens L34 construct a second cemented lens B2 that has overall negative refractive power and is meniscus type convex on the object side 11 (and concave on the image plane side 12). That is, the third lens group G3 has a positive-positive-positive-negative arrangement of refractive powers in order from the object side 11, and is a lens group where the positive-negative lenses on the image plane side 12 (the side facing the stop St) construct a cemented lens.

The fourth lens group G4 that has positive refractive power and is disposed closest to the image surface 12 (the most image surface side) has a seven-lens configuration including, in order from the object side 11, a biconcave negative lens L41, a biconvex positive lens L42, a meniscus lens L43 that has positive refractive power and is convex on the image plane side 12, a biconcave negative lens L44, a biconvex positive lens L45, a negative meniscus lens L46 that is convex on the image plane side 12, and a biconvex positive lens L47. The negative lens L41 and the positive lens L42 construct a third cemented lens B3 that has overall negative refractive power and is meniscus type concave on the object side 11 (convex on the image plane side 12). The biconcave negative lens L44 and the biconvex positive lens L45 construct a fourth cemented lens B4 that has overall negative refractive power and is meniscus type concave on the object side 11 convex on the image plane side 12). That is, the fourth lens group G4 has a negative-positive-positive-negative-positive-negative-positive arrangement of refractive powers in order from the object side 11, where the negative-positive lenses on the object side 11 (the side facing the stop St) construct a cemented lens, and where another cemented lens is constructed by negative-positive lenses positioned following a lens with positive refractive power.

The stop St is disposed on the object side 11 of the fourth lens group G4. As to the stop St, the second cemented lens B2 is disposed on its object side 11 with no other lenses in between and the third cemented lens B3 is disposed on its image plane side 12 with no other lenses in between.

FIG. 2 shows data on the respective lenses that construct the lens system 10 depicted in FIG. 1. "Surface Si" (where i is a number, the same applies below) indicates a lens surface in order from the object side 11, the radius of curvature (Ri) is the radius of curvature (in mm) of each surface of each lens disposed in order from the object side 11, the distance di is the distance (in mm) between the respective lens surfaces, the refractive index ni is the refractive index (d-line) of each lens, the Abbe number vi is the Abbe number (d-line) of each lens, and the effective diameter (Di) (in mm) is the effective diameter of each surface of each lens. The same also applies to the following embodiments.

FIG. 3 shows the composite focal length of the lens system 10, the F number (F No.), the angle of view (in degrees), the distance d6 between the first lens group G1 and the second lens group G2, the distance d9 between the second lens group G2 and the third lens group G3, and the distance d16 between the third lens group G3 and the fourth lens group G4 (in more detail, the distance to the stop St) for the lens system 10 depicted in FIG. 1 at the respective focusing positions of infinity, a standard distance (a distance to an object is 2280 mm), and a closest distance (a distance to an object is 630 mm).

The lens system according to the present invention will now be described further based on the lens system 10 depicted in FIG. 1. The lens system 10 is a lens system for image pickup and consists, in order from the object side 11, of a first lens group G1 with negative refractive power, a second lens group G2 with positive refractive power, a third lens group G3 with positive refractive power, and a fourth lens group G4 with positive refractive power, and as a whole is a retrofocus lens system that has a four-group configuration and is suited to a medium telephoto lens. With this lens system 10, when focusing from infinity to the closest distance, the distance d6 between the first lens group G1 and the second lens group G2 along the optical axis 15 increases, the distance d9 between the second lens group G2 and the third lens group G3 decreases, and the distance d16 between the third lens group G3 and the fourth lens group G4 (d16+d17 if the stop St is not included) increases. That is, during focusing, the second lens group G2 and the third lens group G3 move independently along the optical axis 15 and the fourth lens group G4 including the stop St disposed on the object side 11 of the fourth lens group G4 does not move and is fixed with respect to the image plane 5.

In more detail, in this lens system 10, when focusing from infinity to the closest distance, the first lens group G1 is fixed with respect to the image plane 5, the second lens group G2 moves toward the image plane side 12, and the third lens group G3 moves toward the object side 11. Accordingly, in this lens system 10, during focusing, the first lens group G1 that is closest to the object side 11 (the most object side) and the fourth lens group G4 that is closest to the image plane side 12 (the most image plane side) do not move, thereby keeping the overall length of the lens system 10 constant, but the second lens group G2 and the third lens group G3 move, making the lens system 10 an inner focus-type lens system.

In this lens system 10, by increasing the distance between the first lens group G1 that is negative and the second lens group G2 that is positive during focusing from infinity to the closest distance (infinity to the nearest distance), the focus position on the front side (object side) 11 is moved to a near distance. In addition, by increasing the distance between the first lens group G1 and the second lens group G2 and reducing the distance between the second lens group G2 and the fourth lens group G4, the combined power of the second lens group G2 and the fourth lens group G4 increases compared to the combined power of the first lens group G1 and the second lens group G2, which shifts the position of the principal focal point toward the image plane side 12. Due to this, the focal length of the entire lens system 10 tends to shift to shorter focal lengths, and out of the rays that are incident on the positive second lens group G2, the ray height of on-axis rays (that is, the height in a direction perpendicular to the optical axis 15 from the optical axis 15 to a marginal on-axis ray) increases. However, by moving the positive third lens group G3 toward the object side 11 so as to approach the second lens group G2, the shifting in the focal length of the entire system due to the movement of the second lens group G2 can be corrected. The positive power of the entire lens system 10 moves toward the front to restore the position of the principal focal point to the original position and cause rays with the increased ray height to be bent by the third lens group G3 so as to converge before becoming incident on the fourth lens group G4.

Note that the expression "on-axis rays" used here refers to rays that have been emitted from a spot of light disposed on the optical axis and pass through the stop St, with the principal ray in the on-axis rays being referred to as the "on-axis principal ray". The expression "marginal rays" (or "marginal on-axis rays") is defined as rays, out of the rays emitted from a spot of light disposed on the optical axis, that are farthest from the on-axis principal ray (that is, light rays that pass the edges or peripherals of the entrance pupil of the optical system). These marginal rays define the ray width, which is the width of a light beam composed of on-axis rays.

This means that it is possible to prevent rays from being blocked or excluded by the stop St even if the stop St is fixed together with the fourth lens group G4. Accordingly, by making the stop St fixed during focusing, it is possible to suppress fluctuations in the F number. In addition, since the lens groups that move during focusing can be provided in a concentrated arrangement on the object side 11 of the stop St, it is possible to prevent the stop St from having to be included in the lens moving mechanism, which makes it possible to provide a lens system 10 that has a simple construction and can achieve favorable focusing performance from the closest distance to infinity. In addition, it is possible to provide a lens system 10 that is capable of easily acquiring images in which there is little variation in F number and little variation in brightness caused by focusing.

In addition, during focusing, the total length of the lens system 10 does not vary, and the lens groups that move during focusing can be limited to the adjacent second lens group G2 and third lens group G3, which makes it possible to simplify the driving mechanism. Since the directions in which the second lens group G2 and the third lens group G3 move during focusing are opposite, there is little change in the center of gravity of the lens system 10 as a whole. Accordingly, it is possible to provide a lens system 10 that is easy to handle and can be provided as a handy-type lens.

In this lens system 10, the focal length f2 of the second lens group G2 and the focal length f3 of the third lens group G3 may satisfy the following Condition (1).

$$1.0 \le f2/f3 \le 1.5 \quad (1)$$

When moving the third lens group G3 to compensate for effects caused by the movement of the second lens group G2, it is desirable for the refractive powers of the respective lens groups G2 and G3 to be substantially equal. For this reason, when the lower limit of Condition (1) is exceeded, the refractive power of the third lens group G3 is too low, and it becomes difficult to favorably correct spherical aberration and axial chromatic aberration. When the upper limit of Condition (1) is exceeded, the refractive power of the second lens group G2 is too low, and it becomes difficult to favorably correct spherical aberration.

The movement distance FL1 of the second lens group G2 and the movement distance FL2 of the third lens group G3 may satisfy the following Condition (2).

$$2.5 \le FL1/FL2 \le 4.5 \quad (2)$$

It is necessary to provide a sufficient movement distance FL1 for the second lens group G2 to achieve sufficient focusing performance from infinity to the closest distance. That is, in the lens system 10, by increasing the distance between the negative first lens group G1 and the positive second lens group G2, the position of the principal focal point moves due to the use of a retrofocus configuration to shorten the focal distance, and an effect of moving the image forming position from the object side 11 to the image plane side (the camera side) 12 is achieved. Also, to suppress fluctuations in focal length when moving the second lens group G2, the positive third lens group G3, which is disposed on the image plane side 12 of the second lens group G2, is brought closer to the object side 11, which increases the positive refractive power in a central part of the lens system 10 and reduces the ray height of the on-axis rays that have been dispersed by the negative first lens group G1 and also weakens the positive refractive power on the rear side of the optical system (that is, on the image side of the stop), which returns the principal focal point to its original position.

When the lower limit of Condition (2) is exceeded, the movement distance FL2 of the third lens group G3 is too large, which means that a sufficient relative movement distance FL1 cannot be provided for the second lens group G2. Since the second lens group G2 cannot become sufficiently distanced from the first lens group G1, it becomes difficult to sufficiently adjust the image forming position and to correct various aberrations. As a result, it becomes difficult to correct spherical aberration, curvature of field, and chromatic aberration of magnification. Conversely, when the upper limit of Condition (2) is exceeded, the movement distance FL1 of the second lens group G2 is too large, so that the movement distance FL2 of the third lens group G3 becomes too small. This makes it difficult to correct a shift in the focal length due to movement of the second lens group G2, there is a large change in the angle of view, and it becomes difficult to correct curvature of field.

In this lens system 10, the second lens group G2 is composed of the first cemented lens B1, the third lens group G3 includes the second cemented lens B2, and the fourth lens group G4 includes the third cemented lens B3 and the fourth cemented lens B4. The cemented lens B1 of the second lens group G2 and the second cemented lens B2 of the third lens group G3 move independently during focusing. This means that the role of correcting fluctuations in axial chromatic aberration and chromatic aberration of magnification due to focusing can be shared by the cemented lenses B1 and B2. In particular, the cemented lens B1 where off-axis rays with a large ray height (that is, the height in the direction perpendicular to the optical axis 15 from the off-axis marginal ray farthest from the optical axis 15 to the optical axis 15) are incident has a high correction performance for chromatic aberration of magnification and the cemented lens B2, where off-axis rays with a low ray height are incident, has high correction performance for axial chromatic aberration.

It should be noted that the expression "off-axis rays" used here refers to rays, out of principal rays emitted from spots of light disposed away from the optical axis and that pass through the stop St, for which the angle between the optical axis 15 and a principal ray incident on a lens surface closest to the object side 11 makes the largest angle. The principal ray out of the off-axis rays is defined as the "off-axis principal ray". The expression "marginal rays" for the off-axis rays (or "off-axis marginal rays") are rays, out of the off-axis rays, that are furthest from the off-axis principal ray. These marginal off-axis rays define the ray width that is the width of a beam composed of the off-axis rays. The distance between the off-axis marginal rays and the optical axis 15 differs depending on the position in a cross section of the light beam that is perpendicular to the off-axis principal rays. For this reason, out of the off-axis marginal rays that are incident on the lens surface disposed closest to the object side 11, a ray for which the distance from the optical axis 15 is largest (most separated) is defined as the "lower marginal ray" and a ray that is the shortest distance from (i.e., closest to) the optical axis 15 is defined as the "upper marginal ray".

The third lens group G3 includes at least one meniscus lens that has positive refractive power, is convex on the object side 11, and is disposed on the object side 11 of the second cemented lens B2. In the present embodiment, the third lens group G3 includes two positive meniscus lenses L31 and L32 that are convex on the object side 11 and are positioned on the object side 11 of the cemented lens B2.

The positive meniscus lenses L31 and L32 act in a direction where the on-axis marginal rays are bent so as to strongly converge toward the on-axis principal ray to narrow the ray height of the on-axis rays. Accordingly, the second cemented lens B2 disposed on the image plane side 12 of the positive meniscus lenses L31 and L32 and the stop St which follows the second cemented lens B2 can be made smaller. On the other hand, the positive meniscus lenses L31 and L32 produce aberration for the on-axis rays. However, since the positive meniscus lenses L31 and L32 are disposed with their convex surfaces facing the object side 11, the production of spherical aberration is suppressed, and since two lenses are provided, the curvature of the surfaces of the respective lenses can be made gradual. This means that the production of aberrations, including spherical aberration, by the positive meniscus lenses L31 and L32 is suppressed. For off-axis rays, the closer rays are incident to the periphery of the convex surfaces on the object side 11 of the positive meniscus lenses L31 and L32, the greater the bending of the rays toward the optical axis 15, with the rays being bent in the opposite direction by the concave surfaces on the image plane side 12. As a result, it is possible to cause convergence of the off-axis principal ray and the off-axis marginal rays without creating an imbalance between the incident angle and the exit angle. Accordingly, it becomes possible to suppress aberrations caused by such an imbalance.

By disposing the positive meniscus lenses L31 and L32 that are convex on the object side 11 in the third lens group G3, it is possible to effectively reduce the ray height of the off-axis rays and to reduce the lens diameter of the cemented lens B2 disposed on the image plane side 12 of the positive meniscus lenses L31 and L32. The positive meniscus lenses L31 and L32 cause convergence in the ray width between the upper marginal ray and the lower marginal ray out of the off-axis rays (that is, the distance from the upper marginal ray to the lower marginal ray in a cross section that is perpendicular to the off-axis principal ray), and cause coma in the opposite direction to the coma aberration produced by the cemented lens B2 that has negative refractive power and is disposed on the image plane side 12 of the positive meniscus lenses L31 and L32. This produces an overall reduction in coma aberration. Although a single positive meniscus lens may be disposed on the object side 11 of the third lens group G3, by using two positive meniscus lenses instead, it is possible to distribute the refractive power to the two lenses L31 and L32, which makes it possible to weaken the power of the respective lenses and/or to relax the radii of curvature, which further suppresses the occurrence of various aberrations.

The first cemented lens B1 may be a meniscus lens type that is convex on the image plane side 12 and the second cemented lens B2 may be a meniscus lens type that is convex on the object side 11. By disposing a meniscus lens type cemented lens B2 that is convex on the object side 11 (and concave on the image plane side 12) on the object side 11 of the stop St, the stop St can be made smaller. By disposing the meniscus-type cemented lens B1 that faces in the opposite direction on the object side 11 of the cemented lens B2, it is possible to effectively correct the spherical aberration produced by these cemented lenses B1 and B2. From the respective object sides 11, the cemented lens B1 is a combination of negative and positive refractive powers and the cemented lens B2 is a combination of positive and negative refractive powers, so that in addition to the shapes of the surfaces, the arrangements of refractive power are also symmetrical, which makes it possible to suppress spherical aberration more effectively.

In addition, as described earlier, in the lens system 10, the fourth lens group G4 includes the third cemented lens B3 disposed on the object side 11 and the fourth cemented lens B4 disposed on the image plane side 12. Accordingly, in the lens system 10, the first cemented lens B1 and the second cemented lens B2, and the third cemented lens B3 and the fourth cemented lens B4 are symmetrically disposed on both sides of the stop St, which means that correction of aberration can be distributed and independently performed in the respective optical systems that have the stop St in between. This means that the lens system 10 as a whole has high correction performance for chromatic aberration.

In addition, the effective diameter B1D of the first cemented lens B1, the effective diameter B2D of the second cemented lens B2, the effective diameter B3D of the third cemented lens B3, and the effective diameter B4D of the fourth cemented lens B4 may satisfy the following Condition (3).

$$B1D > B2D$$

$$B3D < B4D \tag{3}$$

The effective diameter Di of the surface closest to the object side 11 can be used as a representative effective diameter of each cemented lens, so that for the present lens system 10, Condition (3) can be expressed as the following Condition (3a).

$$D7 > D14$$

$$D18 < D23 \tag{3a}$$

Also, the difference between the Abbe number B1p (v8) of the lens L22 with positive refractive power and the Abbe number B1m (v7) of the lens L21 with negative refractive power in the first cemented lens B1, the difference between the Abbe number B2p (v14) of the lens L33 with positive refractive power and the Abbe number B2m (v15) of the lens L34 with negative refractive power in the second cemented lens B2, the difference between the Abbe number B3p (v19) of the lens L42 with positive refractive power and the Abbe number B3m (v18) of the lens L41 with negative refractive power in the third cemented lens B3, and the difference between the Abbe number B4p (v24) of the lens L45 with positive refractive power and the Abbe number B4m (v23) of the lens L44 with negative refractive power in the fourth cemented lens B4 may satisfy the following Condition (4).

$$|B1p-B1m| < |B2p-B2m|$$

$$|B3p-B3m| > |B4p-B4m| \tag{4}$$

The lens system 10 includes a total of four cemented lenses B1 to B4. When Condition (3) or Condition (3a) is satisfied, the four cemented lenses B1 to B4 are aligned in an order where the ray height of the off-axis rays from the object side 11 is "high-low-low-high". When Condition (4) is satisfied, the differences in Abbe number between the positive and negative lenses that form the four cemented lenses B1 to B4 are arranged in "small-large-large-small" order. This means that in the lens system 10 as a whole, the two cemented lenses B1 and B2 can be disposed so as to be symmetrical, in terms of ray height and the difference in Abbe number, with the cemented lenses B3 and B4 with the stop St in between. Accordingly, the lens system 10 has high correction performance for chromatic aberration.

Before and after the stop St in the lens system 10, the third lens group G3 includes the cemented lens B2 that is disposed on the object side 11 of the stop St and has a surface S16 on the image plane side 12 including a surface that is concave on the object side 11 and the fourth lens group G4 includes the cemented lens B3 that is disposed on the image plane side 12 of the stop St and has a surface S18 on the object side 11 including a surface that is concave on the image plane side 12. The cemented lens B2 is closest to the image plane side 12 in the third lens group G3 and the cemented lens B3 is closest to the object side 11 in the fourth lens group G4. By disposing the cemented lenses B2 and B3 before and after the stop St where the ray height of the off-axis rays becomes low, it is possible to prioritize correction of axial chromatic aberration. Also, by placing the cemented lenses B2 and B3 with their concave surfaces facing each other, coma aberration and distortion are produced in opposite directions so as to cancel each other out, which makes it possible to efficiently correct aberrations.

In addition, the cemented lens B2 is a combination, in order from the object side 11, of a lens L33 with positive refractive power and a lens L34 with negative refractive power, and the cemented lens B3 is a combination, in order from the object side 11, of a lens L41 with negative refractive power and a lens L42 with positive refractive power. This means that it is possible to use a symmetrical positive-negative and negative-positive arrangement of lenses on both sides of the stop St in the form of the cemented lenses B2 and B3, which makes it possible to effectively correct spherical aberration and axial aberrations such as axial chromatic aberration and coma aberration. In more detail, the lens L34 that has a concave surface S16 on the object side 11 of the stop St is a negative meniscus lens that has negative refractive power and is convex on the object side 11, and forms the cemented lens B2 together with the positive meniscus lens L33 that is convex on the object side 11 and has positive refractive power. The lens L41 with the concave surface S18 on the image plane side 12 of the stop St is a biconcave negative lens and constructs the cemented lens B3 together with a biconvex positive lens L42.

In addition, the radius of curvature g3er (r16) of the surface S16, which is concave on the object side 11, and the radius of curvature g4fr (r18) of the surface S18, which is concave on the image plane side 12, that face the stop St in the cemented lenses B2 and B3 may satisfy the following Condition (5).

$$2.5 \leq |g4fr/g3er| \leq 4.0 \tag{5}$$

The cemented lenses B2 and B3 disposed on both sides of the stop St construct a symmetrical arrangement centered on the stop St, which makes it possible to favorably correct aberration as described above. In addition, by adding asymmetry in that the radius of curvature r18 of the concave surface S18 on the image plane side 12 of the stop St is more gradual than the radius of curvature r16 of the concave surface S16 on the object side 11, it is possible to use a retrofocus-type arrangement and to reduce the sensitivity of the fourth lens group G4, which follows the stop St and is sensitive to tolerances. Accordingly, it is possible to provide a lens system that favorably corrects aberrations, has stable performance, and is easy to handle.

The angle of incidence of off-axis rays on the surface S18 on the image plane side 12 of the stop St can also be reduced. This achieves an effect in that it is possible to suppress the occurrence of negative coma (or "inward coma"). Accordingly, when the lower limit of Condition (5) is exceeded, it becomes difficult to correct spherical aberration and curvature of field, and when the upper limit of Condition (5) is exceeded, it becomes difficult to correct spherical aberration and axial chromatic aberration.

The second cemented lens B2 disposed on the object side 11 of the stop St of the lens system 10 and the third cemented lens B3 disposed on the image plane side 12 of the stop St include negative refractive powers, and the focal length B2f of the cemented lens B2 and the focal length B3f of the third cemented lens B3 may satisfy the following Condition (6).

$$1.7 \leq B3f/B2f \leq 3.0 \tag{6}$$

In the retro-focus type lens system 10 where the first lens group G1 with negative refractive power is positioned at the front, the cemented lenses B2 and B3 are symmetrically disposed before and after the stop St to improve the aberration correction performance, and by using an asymmetrical configuration where the refractive power of the cemented lens B2 on the object side 11 is set higher than the cemented lens B3 on the image plane side 12, light rays are focused more strongly on the object side 11 of the stop St, which makes it possible to make the configuration on the image plane side 12, including the stop St, more compact. When the upper limit of Condition (6) is exceeded, the refractive power of the cemented lens B3 becomes too weak relative to the cemented lens B2, which makes it difficult to cancel out the spherical aberration produced by the cemented lens B2. The imbalance in refractive power with the cemented lens B2 also makes it difficult to sufficiently correct axial chromatic aberration. Conversely, when the lower limit of Condition (6) is exceeded, the refractive power of the cemented lens B3 becomes too strong relative to the cemented lens B2, resulting in an imbalance with the cemented lens B2 so that it becomes difficult to correct axial chromatic aberration. In addition, since the cemented lens B3 becomes able to cause greater divergence of off-axis rays, there is divergence in the emission angles of the upper and lower marginal rays out of the off-axis rays relative to the off-axis principal ray emitted from the cemented lens B3. This destroys the balance between the off-axis principal ray and the off-axis marginal rays out of the off-axis rays, and it becomes difficult to correct chromatic aberration of magnification. Accordingly, when the lower limit of Condition (6) is exceeded, it becomes difficult to correct axial chromatic aberration and chromatic aberration of magnification, and when the upper limit of Condition (6) is exceeded, it becomes difficult to correct spherical aberration and axial chromatic aberration.

The fourth lens group G4 further includes the meniscus lens L43 with positive refractive power that is concave on the object side 11 and is disposed on the image plane side 12 of the cemented lens B3 disposed on the image plane side 12 of the stop St. By disposing the positive meniscus lens L43 that is concave on the object side 11 close to the image plane side 12 of the fourth lens group G4 that is convex on the image plane side 12, it is possible to adjust the balance of the ray width of the off-axis rays with both the width of the upper marginal ray relative to the off-axis principal ray and the width of the lower marginal ray, which makes it possible to correct various aberrations produced for the off-axis rays.

In addition, the radius of curvature B3er (r20) of the surface S20, which is convex on the image plane side 12, on the image plane side 12 of the cemented lens B3 and the radius of curvature Lbfr (r21) of the surface S21, which is concave on the object side 11, on the object side 11 of the meniscus lens L43 that has positive refractive power may satisfy the following Condition (7).

$$1.35 \le |B3er/Lbfr| \le 1.55 \quad (7)$$

By making the radius of curvature r20 (B3er) of the convex surface S20 on the image plane side 12 of the cemented lens B3 larger (i.e., more gradual curvature) than the radius of curvature r21 (Lbfr) of the concave surface S21 on the object side 11 of the positive meniscus lens L43, it becomes possible to cause convergence that reduces the ray width of the off-axis light rays emitted from the convex surface S20 and to correct the off-axis light rays, which tend to converge, using the concave surface S21 so as to become substantially parallel. When doing so, the off-axis rays emitted from the convex surface S20 are refracted as a whole in a direction away from the optical axis, with the rays being bent more strongly from the upper marginal ray toward the lower marginal ray. As a result, the off-axis rays converge. That is, when the off-axis light rays that have crossed the optical axis 15 become incident on the concave surface S21, all of the rays become incident on a curved part of the concave surface S21 on one side of the optical axis 15. This means that the closer the incident angle of a ray on the convex surface S20 to the optical axis 15, the greater the bending of the ray. By doing so, it is possible to adjust the balance of the width of the off-axis rays with both the width of the upper marginal ray relative to the principal ray and the width of the lower marginal ray, which makes it possible to correct various aberrations that are produced for the off-axis rays.

When the upper limit of Condition (7) is exceeded, the refractive power of the concave surface S21 becomes strong and the off-axis marginal rays diverge with respect to the off-axis principal ray out of the off-axis rays incident on the concave surface S21. This creates imbalance in the ray width and angle of the off-axis rays, and makes it difficult to correct spherical aberration and chromatic aberration of magnification. On the other hand, when the lower limit of Condition (7) is exceeded, the refractive power of the concave surface S21 becomes weak, and the off-axis rays incident on the concave surface S21 that tend to converge cannot be restored to substantially parallel. This creates imbalance in the ray width and angle of the off-axis rays, and makes it difficult to correct spherical aberration and axial chromatic aberration.

The fourth lens group G4 includes another cemented lens (fourth cemented lens) B4 disposed on the image plane side 12 of the meniscus lens L43 withs positive refractive power. The radius of curvature Lber (r22) of the surface S22, which is convex on the image plane side 12, on the image plane side 12 of the positive meniscus lens L43 and the radius of curvature B4fr (r23) of the surface S23, which is concave on the object side 11, on the object side 11 of the fourth cemented lens B4 may satisfy the following Condition (8).

$$1.03 \le |Lber/B4fr| \le 1.07 \quad (8)$$

By forming an air lens (air lens portion) between the positive meniscus lens L43 and the fourth cemented lens B4 that is adjacent to the image plane side 12 of the positive meniscus lens L43 and disposing the surface S22 on the image plane side 12 of the meniscus lens L43 and the surface s23 on the object side 11 of the fourth cemented lens B4 close to each other to satisfy Condition (8), the distance between the peripheral parts of the lenses can be reduced to almost zero. In the air lens, the upper and lower marginal rays out of the off-axis rays emitted from the convex surface S22 on the image plane side 12 of the positive meniscus lens L43 bend so as to converge toward the off-axis principal ray. Here, the thickness of the air lens increases from the upper marginal ray toward the lower marginal ray. This means that the lower marginal ray converges toward the off-axis principal ray more than the upper marginal ray converges, and the off-axis principal ray, which is incident so as to be substantially perpendicular, does not bend. As a result, in the air lens, the ray width is reduced mainly due to convergence of the lower marginal ray.

Then, the off-axis rays that tend to converge become incident on the concave surface S23 on the object side 11 of the fourth cemented lens B4. Here, the off-axis principal ray is incident so as to be almost perpendicular and does not bend, but the upper and lower marginal rays diverge in directions away from the off-axis principal ray. In addition, the upper marginal ray is bent in a more divergent direction than the lower marginal ray. As a result, the presence of the air lens causes convergence such that the width between the lower marginal ray and the off-axis principal ray is preferentially narrowed compared to the width between the upper marginal ray and the principal ray. This means that it is possible to further adjust the balance of off-axis rays and favorably correct various aberrations.

When the upper limit of Condition (8) is exceeded, the radius of curvature of the concave surface S23 becomes too small (tight) compared to the convex surface S22, so that the rays emitted from the air lens portion excessively diverge. This destroys the balance between the off-axis marginal rays and the off-axis principal ray and makes it difficult to correct spherical aberration and curvature of field. When the lower limit of Condition (8) is exceeded, the radius of curvature of the convex surface S22 conversely approaches the absolute value of the radius of curvature of the concave surface S23. This results in insufficient divergence of the light rays emitted from the air lens, which destroys the balance between the off-axis marginal rays and the off-axis principal ray and makes it difficult to correct spherical aberration and axial chromatic aberration.

A distance Ld41 (d20) on the optical axis 15 between the surface S20, which is convex on the image plane side 12, on the image plane side 12 of the third cemented lens B3 disposed on the image plane side 12 of the stop St and the surface S21, which is concave on the object side 11, on the object side 11 of the meniscus lens L43 with positive refractive power, and a distance Ld43 (d22) on the optical axis 15 between the surface S22, which is convex on the image plane side 12, on the image plane side 12 of the positive meniscus lens L43 and the surface S23, which is concave on the object side 11, on the object side 11 of the fourth cemented lens B4 disposed on the image plane side 12 of the positive meniscus lens L43 may satisfy the following Condition (9).

$$7 \le Ld41/Ld43 \le 23 \quad (9)$$

When the lower limit of Condition (9) is exceeded, the air lens between the positive meniscus lens L43 and the fourth cemented lens B4 becomes too thick, and it becomes difficult to correct spherical aberration and curvature of field. It is actually difficult to exceed the upper limit of Condition (9) because this would exceed the limit on mechanical adjustment of the interval between lenses.

The distance Ld41 (d20) on the optical axis 15 between the surface S20, which is convex on the image plane side 12, on the image plane side 12 of the third cemented lens B3 disposed on the image plane side 12 of the stop St and the surface S21, which is concave on the object side 11, on the object side 11 of the positive meniscus lens L43, and the thickness Ld42 (d21) on the optical axis 15 of positive the meniscus lens L43 may satisfy the following Condition (10).

$$0.6 \leq Ld41/Ld42 \leq 1.0 \tag{10}$$

When the upper limit of Condition (10) is exceeded, the distance Ld41 (d20) between the third cemented lens B3 and the positive meniscus lens L43 becomes larger than the thickness Ld42 (d21) of the positive meniscus lens L43. This means that out of the rays incident on the interval Ld41, the off-axis principal ray and the off-axis marginal rays excessively converge, and in particular, the off-axis principal ray and the lower marginal ray bend strongly in the direction of convergence compared to the upper marginal ray. As a result, since there is excessive convergence in a state where there is imbalance in the widths between the off-axis principal ray and the off-axis marginal rays, there is excessive correction of spherical aberration and chromatic aberration of magnification. On the other hand, when the lower limit of Condition (10) is exceeded, the distance Ld41 (d20) becomes too short compared to the thickness Ld42 (d21), so that off-axis rays become incident on the positive meniscus lens L43 without sufficient convergence. This means it becomes difficult to correct spherical aberration and chromatic aberration of magnification.

As described above, by providing the second lens group G2, the third lens group G3, and the fourth lens group G4 that have positive refractive powers, it is possible to provide the lens system 10 in which aberrations are favorably corrected. In addition, this lens system 10 is a retrofocus type where negative refractive power is positioned at the front, and the focal length f1 of the first lens group G1 and the focal length f2 of the second lens group G2 may satisfy the following Condition (11).

$$1.0 \leq |f2/f1| \leq 1.15 \tag{11}$$

When the upper limit of Condition (11) is exceeded, the focal length f2 of the second lens group G2, which is positive, becomes too large relative to the focal length f1 of the first lens group G1, which is negative, so that the refractive power of the second lens group G2 is insufficient relative to the lens group G1. This means that even if the second lens group G2 is moved to change the distance between the second lens group G2 and the first lens group G1, it is not possible to sufficiently change the arrangement of powers when the respective groups are combined inside the lens system 10, which makes it difficult to adjust the focus position. In addition, by making the refractive power of the second lens group G2 that is positive weaker than the first lens group G1 that is negative, the balance of the positive refractive power to the negative refractive power is destroyed and it becomes difficult to correct axial chromatic aberration.

On the other hand, when the lower limit of Condition (11) is exceeded, the focal length of the second lens group G2 that is positive becomes too small relative to the first lens group G1 that is negative, and the refractive power of the second lens group G2 becomes too strong relative to the refractive power of the first lens group G1. Although it is advantageous in reducing the amount of movement of the positive second lens group G2 during focusing, when the refractive power of the positive second lens group G2 becomes too strong, the balance of the positive refractive power relative to the negative first lens group G1 is destroyed and axial chromatic aberration is excessively corrected, which makes correction difficult. The balance between the on-axis principal ray and the on-axis marginal rays out of the on-axis rays emitted from the positive second lens group G2 and the balance between the off-axis principal ray and the off-axis marginal rays out of the off-axis rays are also destroyed, which increases the fluctuations in aberration before and after the focus position.

At a position closest to the object side 11 (the most object side), the first lens group G1 may include a first meniscus lens L11 that has positive refractive power and is convex on the object side 11. By disposing the convex lens L11 closest to the object side 11 where the ray height is large, it is possible to effectively correct aberrations such as distortion produced by the negative refractive power disposed on the image plane side 12 of the first lens L11. By forming the convex lens L11 as a meniscus lens whose convex surface faces the object side 11 in particular, it is possible to effectively reduce the ray height without increasing the refractive power, while suppressing spherical aberration produced by the convex lens L11. This means that it is possible to suppress an increase in the diameters of the following lenses while suppressing the occurrence of chromatic aberration and the like.

In addition, the first lens group G1 includes a second lens L12 with negative refractive power disposed adjacent to the positive meniscus lens L11, and a thickness Ld1 (d1) on the optical axis of the first lens L11 and the distance Ld12 (d2) on the optical axis 15 between the first lens L11 and the second lens L12 may satisfy the following Condition (12).

$$0.35 \leq Ld12/Ld1 \leq 0.70 \tag{12}$$

When the upper limit is exceeded in Condition (12), the lens interval Ld12 (d2) becomes too large, so that off-axis rays and the on-axis rays emitted from the positive meniscus lens L11 excessively converge, resulting in the ray height becoming too small. This means that the correction performance of the positive meniscus lens L11 for aberrations produced by the negative lens group including the second lens L12 disposed on the image plane side 12 of the positive meniscus lens L11 in the first lens group G1 is excessive, resulting in the production of strong spherical aberration and curvature of field.

On the other hand, when the lower limit of Condition (12) is exceeded, the lens interval Ld12 (d2) becomes too small, so that the off-axis rays and the on-axis rays emitted from the positive meniscus lens L11 cannot sufficiently converge and the light rays become incident on the negative meniscus lens L12 on the image plane side 12 of the first lens group G1 in a state where the ray height is high. This results in the divergence caused by the negative meniscus lens L12 having a strong effect and the ability of the positive meniscus lens L11 to correct aberrations produced by the negative lens group in the first lens group G1 becomes insufficient. Accordingly, it becomes difficult to correct spherical aberration and axial chromatic aberration.

As collectively shown in FIG. 3, the lens system 10 depicted in FIG. 1 is a medium telephoto-type lens with a focusing range from infinity to a closest distance of 630 mm and a focal length of 95 mm at infinity. The lens system 10 has a total of 16 lenses, is a comparatively compact lens system where the total length LA (that is, the distance from the lens surface closest to the object side 11 to the lens surface closest to the image plane side 12) is 169.72 mm and the distance to the image pickup plane (imaging plane) 5 is 219.96 mm, and is an inner-focus type lens system where the second lens group G2 and the third lens group G3 move during focusing. This lens system is configured so that the F number at each focal length is small and constant at 1.68, the stop St does not move during focusing, and the F number does not fluctuate.

As depicted in FIG. 4, the surface 27 on the image plane side 12 of the negative meniscus lens L46, which is convex on the image plane side 12, in the fourth lens group G4 is aspherical. When X is the coordinate in the optical axis direction, Y is the coordinate in the direction perpendicular to the optical axis, the direction in which light propagates is positive, and R is the paraxial radius of curvature, the aspherical surface is expressed by the following equation (X) using the coefficients K, A, B, C, D, E, and F indicated in FIG. 4. The same also applies to the following embodiments. Note that "En" means "10 to the nth power".

$$X=(1/R)Y^2/[1+\{1-(1+K)(1/R)^2Y^2\}^{1/2}]+ AY^4 \pm BY^6 \pm CY^8 \pm DY^{10} + EY^{12} + FY^{14} \quad (X)$$

FIGS. 5 to 7 depict various aberrations when the lens system 10 is focused at infinity, a standard distance, and a closest position. FIGS. 5(a), 6(a), and 7(a) depict spherical aberration, astigmatism, and distortion, while FIGS. 5(b), 6(b), and 7(b) depict lateral aberration. Spherical aberration is indicated for the wavelength 435.8 nm (dot-dot-dash line), the wavelength 486.1 nm (dot-dash line), the wavelength 546.1 nm (short dashed line), the wavelength 587.6 nm (solid line) and the wavelength 656.3 nm (long dash line). Astigmatism is indicated for tangential rays T and sagittal rays S. Lateral aberration is indicated separately for tangential rays T and sagittal rays S at the same wavelengths as mentioned above.

Various numerical values and values of the respective conditions for the lens system 10 according to the present embodiment are as indicated below.

Focal length f1 of first lens group G1: −131.56 mm
Focal length f2 of second lens group G2: 135.28 mm
Focal length f3 of third lens group G3: 113.40 mm
Focal length f4 of fourth lens group G4: 66.61 mm
Movement distance FL1 of second lens group G2: 17.02 mm
Movement distance FL2 of third lens group G3: 5.51 mm
Focal length B1f of first cemented lens B1: 135.28 mm
Focal length B2f of second cemented lens B2: −85.57 mm
Focal length B3f of third cemented lens B3: −168.27 mm
Focal length B4f of fourth cemented lens B4: −21148.18 mm

| | |
|---|---|
| (f2/f3):1.19 | Condition (1) |
| (FL1/FL2):3.09 | Condition (2) |
| (B1D>B2D,B3D<B4D(D7>D14,D18<D23)): (53.18>45.56,31.60<31.72) | Condition (3) |
| (\|B1p−B1m\|<\|B2p−B2m\|,\|B3p−B3m\|>\|B4p−B4m\|): (\|44.20−25.43\|<\|94.66−34.71\|,\|81.55− 31.08\|>\|40.77−34.71\|) | Condition (4) |
| (\|g4fr/g3er\|(\|r18/r16\|)):3.08 | Condition (5) |
| (B3f/B2f):1.97 | Condition (6) |
| (\|B3er/Lbfr\|(\|r20/r21\|)):1.51 | Condition (7) |
| (\|Lber/B4fr\|(\|r22/r23\|)):1.04 | Condition (8) |
| (Ld41/Ld43(d20/d22)):11.29 | Condition (9) |
| (Ld41/Ld42(d20/d21)):0.70 | Condition (10) |
| (\|f2/f1\|):1.03 | Condition (11) |
| (Ld12/Ld1(d2/d1)):0.45 | Condition (12) |

As described above, the lens system 10 depicted in FIG. 1 is a compact lens system whose length is fixed and is configured as a lens system with 16 lens elements in four groups where there is little movement in the center of gravity during focusing. This makes the lens system easy to handle. In addition, this lens system 10 has an F number that is fixed during focusing, which makes focusing easy and makes it possible to obtain images that are clear or have little fluctuation in brightness at a desired focusing position. The lens system 10 also satisfies Conditions (1) to (12). As depicted in FIGS. 5 to 7, it is possible to obtain images in which various aberrations are favorably corrected across the entire focusing range.

In this lens system 10, focusing is performed by the second lens group G2 and the third lens group G3 that are disposed on the object side 11 of the stop St, so that the function (mechanisms) for adjusting the focal length can be provided away from the stop St and concentrated to the front of the stop St. Accordingly, these mechanisms can be simplified, and it is possible to provide a compact lens system 10 and image pickup apparatus 1 that are more lightweight and high-performance.

Figure 8:
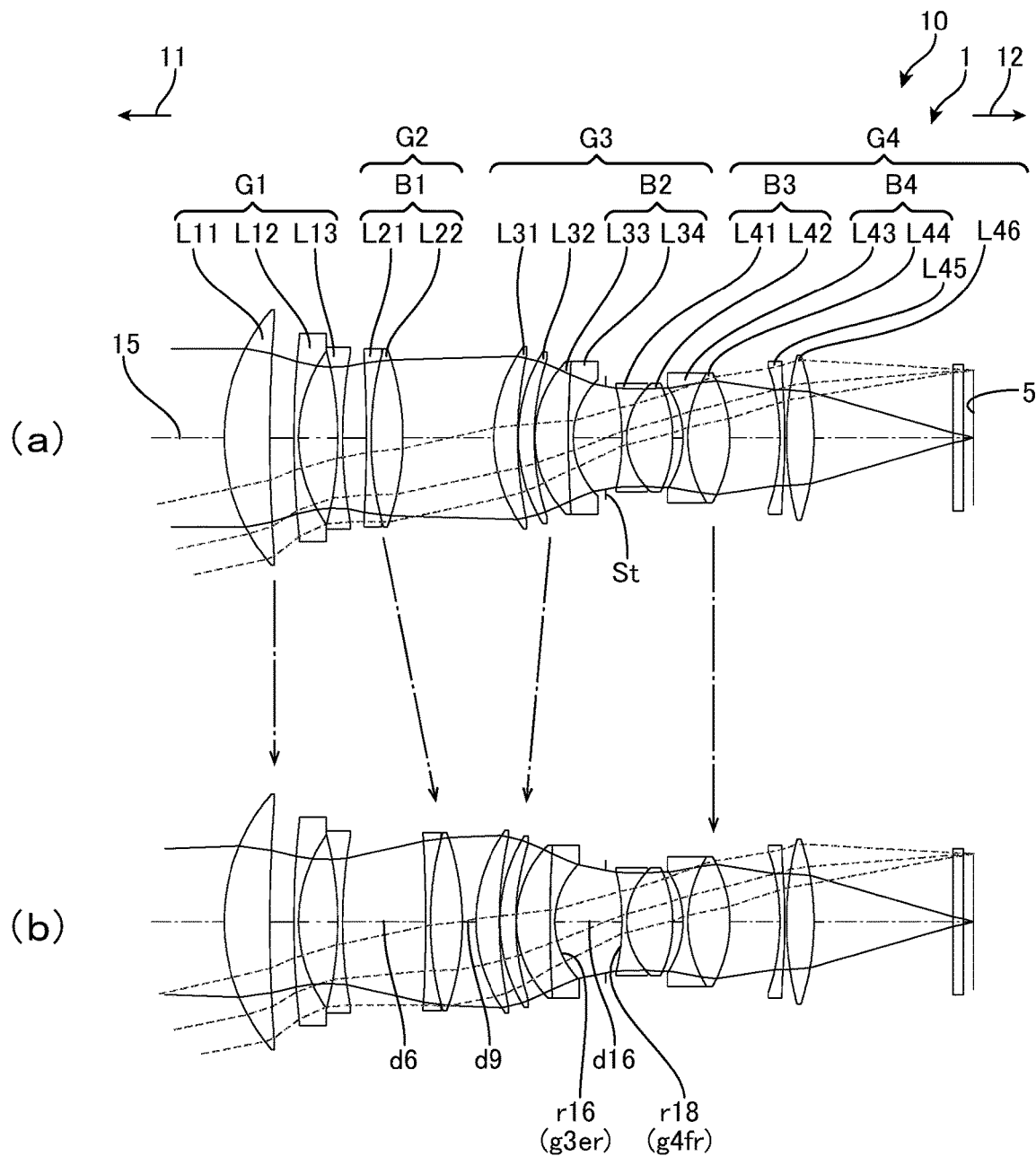
FIG. 8 is a diagram depicting an arrangement of another example of a lens system and an image pickup apparatus.

FIG. 8 depicts a different example of an image pickup apparatus 1. This imaging apparatus (camera) 1 also includes an optical system (image pickup optical system, image forming optical system, or lens system) 10 and an imaging element (image pickup element, image pickup device or image plane) 5 disposed on the image plane side (image side, image pickup side, or image forming side 12 of the lens system 10. The lens system 10 is an optical system for image pickup and is a lens system configured with fifteen lenses in four groups. FIG. 8(a) depicts the lens arrangement when the focus position is at infinity, and FIG. 8(b) depicts the lens arrangement when the focus position is at the closest position (nearest position, 630 mm).

This lens system 10 also has a four-group configuration, where the first lens group G1, which is closest to the object side 11 and whose combined refractive power is negative, and the fourth lens group G4, which is closest to the image plane side 12 and whose combined refractive power is positive, are fixed lens groups that do not move during focusing and whose distances from the image plane 5 do not change. The stop (aperture stop) St disposed on the object side 11 of the fourth lens group G4 is also fixed at a distance that does not change from the image plane 5. The second lens group G2 with positive refractive power that is disposed on the image plane side 12 of the first lens group G1 moves in one direction toward the image plane side 12 when the focus position moves from infinity to the closest distance. The third lens group G3 with positive refractive power that is disposed on the image plane side 12 of the second lens group G2 moves in one direction toward the object side 11 when the focus position moves from infinity to the closest distance.

FIG. 9 shows data on each lens that constructs the lens system 10. FIG. 10 shows the focal length, the F number, and the values of the variable intervals d6, d9, and d16 when the system is focused at infinity, the standard distance (2280 mm), and the closest distance (nearest, 630 mm). FIG. 11 shows coefficients of the aspherical surfaces included in the lens system 10. In this example, the surface S25 on the image plane side 12 of the negative meniscus lens L46 on the image plane side 12 of the fourth lens group G4 is aspherical.

Figure 12:
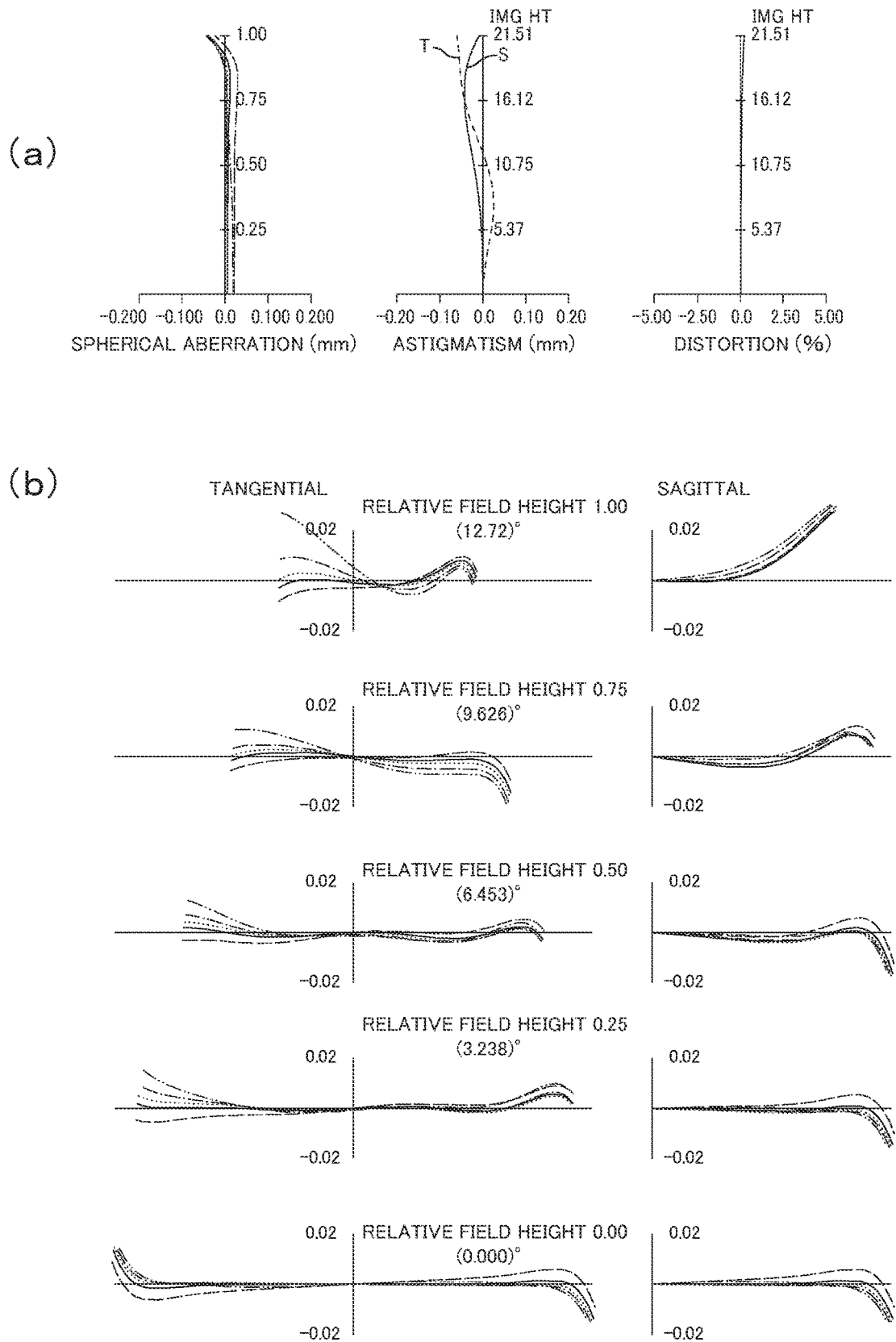
FIG. 12 is a diagram showing various aberrations when the focal length is at infinity.
Figure 13:
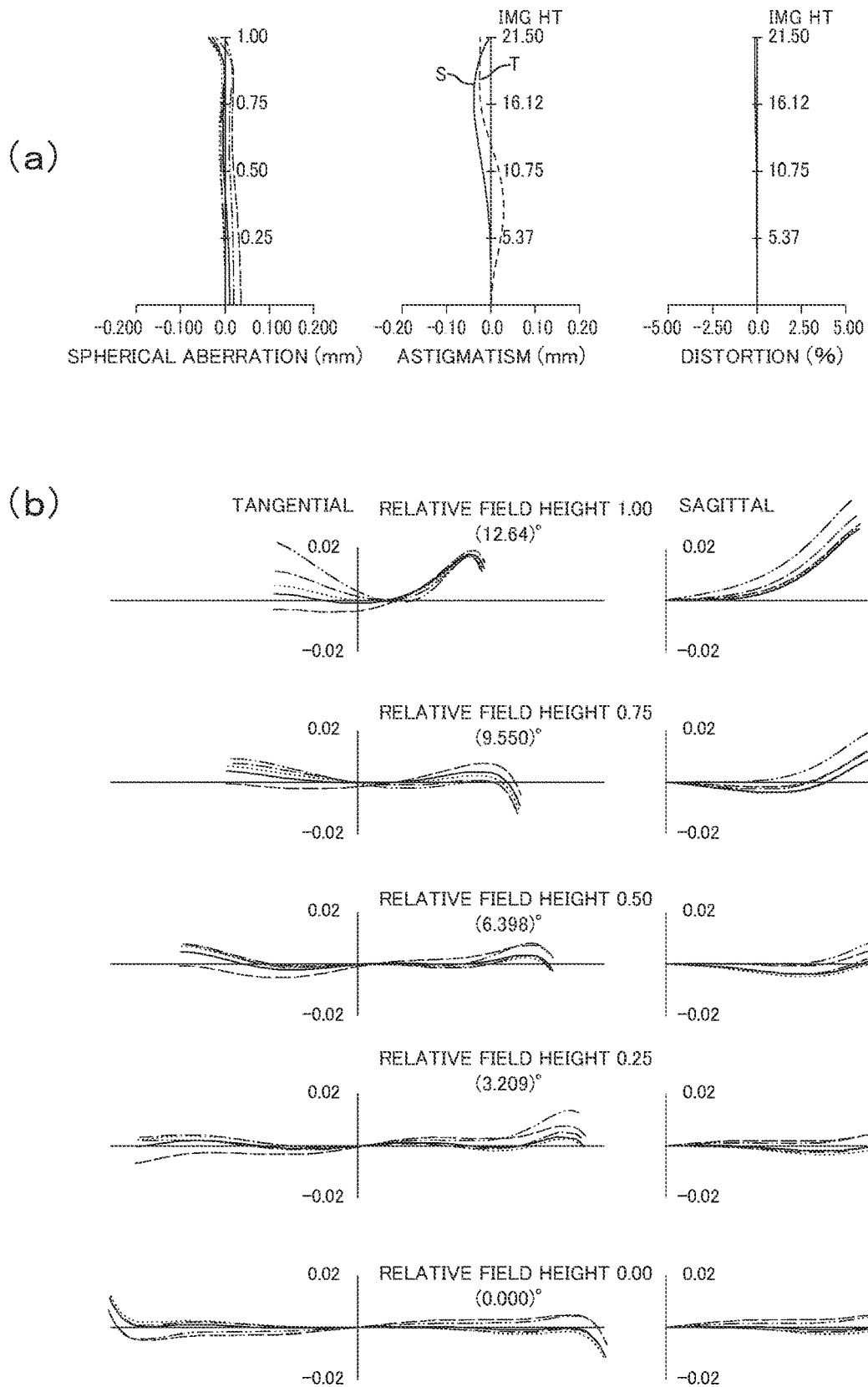
FIG. 13 is a diagram showing various aberrations when the focal length is at a standard distance (an intermediate distance).

FIGS. 12 to 14 depict spherical aberration, astigmatism, and distortion, and also lateral aberration when the lens system 10 is focused at infinity, a standard distance, and the closest position. FIGS. 12(a), 13(a), and 14(a) depict spherical aberration, astigmatism, and distortion, while FIGS. 12(b), 13(b), and 14(b) depict lateral aberration.

The fundamental configuration of this lens system 10 is the same as the lens system 10 depicted in FIG. 1. The first lens group G1 is a lens group with negative refractive power that is fixed (i.e., does not move during focusing) at a position closest to the object side 11, and has a three-lens configuration including, in order from the object side 11, a meniscus lens L11 with positive refractive power that is convex on the object side 11, a meniscus lens L12 with negative refractive power that is convex on the object side 11, and a biconcave negative lens L13, thereby producing a positive-negative-negative arrangement of refractive powers. The second lens group G2, which has positive refractive power and moves toward the image plane side 12 so that the distance d6 from the first lens G1 increases along the optical axis 15 during focusing from infinity to the closest distance, has a two-lens configuration composed, in order from the object side 11, of a biconcave negative lens L21 and a biconvex positive lens L22. This means that the second lens group G2 has a negative-positive arrangement of refractive powers, with the negative lens L21 and the positive lens L22 forming the first cemented lens B1 that has overall positive refractive power and is convex on the image plane side 12.

The third lens group G3 that has positive refractive power and, when focusing from infinity to the closest distance, moves along the optical axis 15 toward the object side 11 so that the distance from the first lens G1 and the second lens group G2 decreases. The third lens group G3 has a four-lens configuration which includes, in order from the object side 11, a meniscus lens L31 with positive refractive power that is convex on the object side 11, a meniscus lens L32 with positive refractive power that is convex on the object side 11, a meniscus lens L33 with positive refractive power that is convex on the object side 11, and a meniscus lens L34 with negative refractive power that is concave on the image plane side 12, producing a positive-positive-positive-negative arrangement of refractive powers. The positive meniscus lens L33 and the negative meniscus lens L34 form a second cemented lens B2 that has negative refractive power and is convex on the object side 11 (that is, concave on the image plane side 12).

The fourth lens group G4, which has positive refractive power and is disposed closest to the image plane side 12, has a six-lens configuration including, in order from the object side 11, a biconcave negative lens L41, a biconvex positive lens L42, a biconcave negative lens L43, a biconvex positive lens L44, a negative meniscus lens L45 that is convex on the image plane side 12, and a biconvex positive lens L46, producing a negative-positive-negative-positive-negative-positive arrangement of refractive powers. The negative lens L41 and the positive lens L42 form a third cemented lens B3 with overall negative refractive power which is concave on the object side 11 (that is, convex on the image plane side 12). The biconcave negative lens L43 and a biconvex positive lens L44 adjacent to the image plane side 12 of the third cemented lens B3 form a fourth cemented lens B4 with overall negative refractive power that is concave on the object side 11 (that is, convex on the image plane side 12). Accordingly, in this lens system 10, compared to the lens system depicted in FIG. 1, the positive meniscus lens that is convex on the image plane side 12 disposed between the third cemented lens B3 and the fourth cemented lens B4 is omitted and the fourth cemented lens B4 is a cemented lens that has overall positive refractive power.

A stop St is disposed on the object side 11 of the fourth lens group G4. As to the stop St, the second cemented lens B2 is disposed on the object side 11 with no other lenses in between and the third cemented lens B3 is disposed on the image plane side 12 with no other lenses in between.

As collectively indicated in FIG. 10, the lens system 10 according to the present embodiment is also a medium telephoto-type lens with a focus range from infinity to a closest distance of 630 mm and a focal length at infinity of 95 mm. The lens system 10 has a total of 15 lenses, is an even more compact lens system where the total length LA (that is, the distance from the lens surface closest to the object side 11 to the lens surface closest to the image plane side 12) is 129.9 mm and the distance to the imaging plane 5 is 176.68 mm, and is an inner focus-type lens system where the second lens group G2 and the third lens group G3 move during focusing. This lens system is configured so that the F number at each focal length is small and constant at 1.68, the stop St does not move during focusing, and the F number does not fluctuate.

Various numerical values and the values of the respective conditions for this lens system 10 are as indicated below. Note that in the lens system 10 according to the present embodiment, since the fourth lens group G4 has the third cemented lens B3 and the fourth cemented lens B4 adjacent to each other and omits the positive meniscus lens, Conditions (7) to (10) are not evaluated.

Focal length f1 of first lens group G1: −132.25 mm
Focal length f2 of second lens group G2: 139.90 mm
Focal length f3 of third lens group G3: 110.39 mm
Focal length f4 of fourth lens group G4: 65.94 mm
Movement distance FL1 of second lens group G2: 17.40 mm
Movement distance FL2 of third lens group G3: 5.39 mm
Focal length B1f of first cemented lens B1: 139.90 mm
Focal length B2f of second cemented lens B2: −87.21 mm
Focal length B3f of third cemented lens B3: −252.93 mm
Focal length B4f of fourth cemented lens B4: 247.56 mm

| | |
|---|---|
| (f2/f3):1.27 | Condition (1) |
| (FL1/FL2):3.23 | Condition (2) |
| (B1D>B2D,B3D<B4D(D7>D14,D18<D21)): (53.16>45.66,31.36<31.80) | Condition (3) |
| (\|B1p−B1m\|<\|B2p−B2m\|,\|B3p−B3m\|>\|B4p−B4m\|): (\|44.20−25.43\|<\|94.66−34.71\|,\|81.55−31.08\|>\|40.77−34.71\|) | Condition (4) |
| (\|g4fr/g3er\|(\|r18/r16\|)):2.71 | Condition (5) |
| (B3f/B2f):2.90 | Condition (6) |
| (\|f2/f1\|):1.06 | Condition (11) |
| (Ld12/Ld1(d2/d1)):0.52 | Condition (12) |

As described above, the lens system 10 depicted in FIG. 8 is a compact lens system whose length is fixed and is configured as a lens system with 15 lens elements in four groups where there is little movement in the center of gravity during focusing. This makes the lens system easy to handle. In addition, this lens system 10 has a fixed F number during focusing, which makes focusing easy and makes it possible to obtain images that are clear or have little fluctuation in brightness at a desired focusing position. This lens system 10 also satisfies Conditions (1) to (6), (11) and (12). As depicted in FIGS. 12 to 14, it is possible to obtain images in which various aberrations are favorably corrected across the entire focusing range.

In this lens system 10 also, focusing is performed by the second lens group G2 and the third lens group G3 disposed on the object side 11 of the stop St, so that the function (mechanisms) for adjusting the focal length can be provided away from the stop St and concentrated to the front of the stop St. Accordingly, it is possible to simplify these mechanisms and to provide a compact lens system 10 and image pickup apparatus 1 that are more lightweight and high-performance.

The invention claimed is:

1. A lens system for imaging consisting, in order from an object side, of a first lens group that has negative refractive power, a second lens group that has positive refractive power, a third lens group that has positive refractive power, a stop, and a fourth lens group that has positive refractive power, wherein the third lens group includes, at a position closest to an image plane side, a cemented lens disposed on the object side of the stop and including an image plane side-surface with a surface that is concave on the object side, the fourth lens group includes, at a position closest to the object side, a cemented lens disposed closest to the image plane side of the stop and including an object side surface with a surface that is concave on the image plane side, and the cemented lens disposed on the object side of the stop and the cemented lens disposed on the image plane side of the stop have negative refractive powers, a radius of curvature g3er of the surface that is concave on the object side, a radius of curvature g4fr of the surface that is concave on the image surface side, a focal length B2f of the cemented lens disposed on the object side of the stop and a focal length B3f of the cemented lens disposed on the image plane side of the stop satisfy following conditions:

$2.5 \leq |g4fr/g3er| \leq 4.0$, and $1.7 \leq B3f/B2f \leq 3.0$.

2. An imaging apparatus comprising:
a lens system according to claim 1; and
an imaging element disposed on the image plane side of the lens system.

3. The lens system according to claim 1, A lens system for imaging consisting, in order from an object side, of a first lens group that has negative refractive power, a second lens group that has positive refractive power, a third lens group that has positive refractive power, a stop, and a fourth lens group that has positive refractive power, wherein the third lens group includes, at a position closest to an image plane side, a cemented lens disposed on the object side of the stop and including an image plane side-surface with a surface that is concave on the object side, the fourth lens group includes, at a position closest to the object side, a cemented lens disposed closest to the image plane side of the stop and including an object side surface with a surface that is concave on the image plane side, and a meniscus lens with positive refractive power, being concave on the object side, disposed on the image plane side of the cemented lens disposed on the image plane side of the stop, and a radius of curvature g3er of the surface that is concave on the object side and the radius of curvature g4fr of the surface that is concave on the image surface side satisfy a following condition:

$2.5 \leq |g4fr/g3er| \leq 4.0$.

4. The lens system according to claim 3,
wherein a radius of curvature B3er of a surface, which is convex on the image plane side, on the image plane side of the cemented lens disposed on the image plane side of the stop and a radius of curvature Lbfr of a surface, which is concave on the object side, on the object side of the meniscus lens with positive refractive power satisfy a following condition:

$1.35 \leq |B3er/Lbfr| \leq 1.55$.

5. The lens system according to claim 3,
wherein the fourth lens group includes a cemented lens disposed on the image plane side of the meniscus lens with positive refractive power, and
a radius of curvature Lber of a surface, which is convex on the image plane side, on the image plane side of the meniscus lens with positive refractive power and a radius of curvature B4fr of a surface, which is concave on the object side, on the object side of the cemented lens disposed on the image plane side of the meniscus lens with positive refractive power satisfy a following condition:

$1.03 \leq |Lber/B4fr| \leq 1.07$.

6. The lens system according to claim 5,
wherein a distance Ld41 on an optical axis between a surface, which is convex on the image plane side, on the image plane side of the cemented lens disposed on the image plane side of the stop and a surface, which is concave on the object side, on the object side of the meniscus lens with positive refractive power, and a distance Ld43 on the optical axis between a surface, which is convex on the image plane side, on the image plane side of the meniscus lens with positive refractive power and a surface, which is concave on the object side, on the object side of the cemented lens disposed on the image plane side of the meniscus lens with positive refractive power satisfy a following condition:

$7 \leq Ld41/Ld43 \leq 23$.

7. The lens system according to claim 5,
wherein a distance Ld41 on the optical axis between a surface, which is convex on the image plane side, on the image plane side of the cemented lens disposed on the image plane side of the stop and a surface, which is concave on the object side, on the object side of the meniscus lens with positive refractive power, and a thickness Ld42 on the optical axis of the meniscus lens with positive refractive power satisfy a following condition:

$0.6 \leq Ld41/Ld42 \leq 1.0$.

8. The lens system according to claim 5,
wherein the second lens group includes a first cemented lens and an effective diameter BM of the first cemented lens, an effective diameter B2D of a second cemented lens on the object side of the stop in the third lens group, an effective diameter B3D of a third cemented lens on the image plane side of the stop in the fourth lens group, and an effective diameter B4D of a fourth cemented lens on the image plane side of the lens with positive refractive power in the fourth lens group satisfy following conditions:

$B1D > B2D$, and $B3D < B4D$.

9. The lens system according to claim 8,
wherein a difference between an Abbe number $B1p$ of the lens with positive refractive power and an Abbe number $B1m$ of the lens with negative refractive power in the first cemented lens, a difference between an Abbe number $B2p$ of the lens with positive refractive power and an Abbe number $B2m$ of the lens with negative refractive power in the second cemented lens, a difference between an Abbe number $B3p$ of the lens with positive refractive power and an Abbe number $B3m$ of the lens with negative refractive power in the third cemented lens, and a difference between an Abbe number $B4p$ of the lens with positive refractive power and an Abbe number $B4m$ of the lens with negative refractive power in the fourth cemented lens satisfy following conditions:

$|B1p-B1m| < |B2p-B2m|$, and $|B3p-B3m| > |B4p-B4m|$.

10. An imaging apparatus comprising:
the lens system according to claim 3; and
an imaging element disposed on the image plane side of the lens system.

11. A lens system for imaging consisting, in order from an object side, of a first lens group that has negative refractive power, a second lens group that has positive refractive power, a third lens group that has positive refractive power, a stop, and a fourth lens group that has positive refractive power,
wherein the third lens group includes, at a position closest to an image plane side, a cemented lens disposed on the object side of the stop and including an image plane side-surface with a surface that is concave on the object side,
the fourth lens group includes, at a position closest to the object side, a cemented lens disposed closest to the image plane side of the stop and including an object side surface with a surface that is concave on the image plane side, and
during focusing from infinity to a closest distance, a distance between the first lens group and the second lens group along an optical axis increases, a distance between the second lens group and the third lens group along the optical axis decreases, and the fourth lens group and the stop disposed on the object side of the fourth lens group are fixed with respect to the image plane, and
a radius of curvature $g3er$ of the surface that is concave on the object side and the radius of curvature $g4fr$ of the surface that is concave on the image surface side satisfy a following condition:

$2.5 < |g4fr/g3er| \le 4.0$.

12. The lens system according to claim 11,
wherein when focusing from infinity to the closest distance, the first lens group is fixed relative to the image plane, the second lens group moves toward the image plane side, and the third lens group moves toward the object side.

13. The lens system according to claim 11,
wherein the cemented lens disposed on the object side of the stop and the cemented lens disposed on the image plane side of the stop have negative refractive powers, and a focal length $B2f$ of the cemented lens disposed on the object side of the stop and a focal length $B3f$ of the cemented lens disposed on the image plane side of the stop satisfy a following condition:

$1.7 \le B3f/B2f \le 3.0$.

14. The lens system according to claim 10,
wherein the fourth lens group includes a meniscus lens with positive refractive power, concave on the object side, and disposed on the image plane side of the cemented lens disposed on the image plane side of the stop.

15. An imaging apparatus comprising:
the lens system according to claim 11; and
an imaging element disposed on the image plane side of the lens system.

* * * * *